United States Patent
Kunishige et al.

(10) Patent No.: US 8,041,203 B2
(45) Date of Patent: Oct. 18, 2011

(54) CAMERA, CAMERA CONTROLLING METHOD, AND RECORDING MEDIUM STORING CAMERA CONTROLLING PROGRAM

(75) Inventors: Keiji Kunishige, Hachioji (JP); Mitsumasa Okubo, Hino (JP)

(73) Assignee: Olympus Imaging Corp., Tokyo (JP)

( * ) Notice: Subject to any disclaimer, the term of this patent is extended or adjusted under 35 U.S.C. 154(b) by 185 days.

(21) Appl. No.: 12/240,160

(22) Filed: Sep. 29, 2008

(65) Prior Publication Data

US 2009/0097835 A1    Apr. 16, 2009

(30) Foreign Application Priority Data

Oct. 15, 2007 (JP) ................................. 2007-268231
Oct. 15, 2007 (JP) ................................. 2007-268232
Oct. 15, 2007 (JP) ................................. 2007-268233
Oct. 15, 2007 (JP) ................................. 2007-268234

(51) Int. Cl.
*G03B 17/00* (2006.01)
(52) U.S. Cl. ............................................. 396/56
(58) Field of Classification Search .......... 396/56, 396/57, 182

See application file for complete search history.

(56) References Cited

U.S. PATENT DOCUMENTS

| 5,384,611 | A | * | 1/1995 | Tsuji et al. | 396/57 |
|---|---|---|---|---|---|
| 5,640,623 | A | * | 6/1997 | Sasaki | 396/180 |
| 5,721,971 | A | * | 2/1998 | Sasaki | 396/56 |
| 6,088,542 | A | * | 7/2000 | Yanai et al. | 396/155 |
| 6,404,987 | B1 | * | 6/2002 | Fukui | 396/56 |
| 6,795,647 | B2 | * | 9/2004 | Iwasaki et al. | 396/56 |
| 2002/0061190 | A1 | * | 5/2002 | Kawasaki et al. | 396/157 |
| 2002/0061192 | A1 | * | 5/2002 | Kawasaki et al. | 396/182 |
| 2006/0171695 | A1 | * | 8/2006 | Jung et al. | 396/56 |
| 2008/0298792 | A1 | * | 12/2008 | Clark | 396/56 |

FOREIGN PATENT DOCUMENTS

JP    2000-89308    3/2000

* cited by examiner

*Primary Examiner* — Clayton E LaBalle
*Assistant Examiner* — Warren Fenwick
(74) *Attorney, Agent, or Firm* — Straub & Pokotylo; John C. Pokotylo

(57) ABSTRACT

A camera includes a mode setting unit which sets an operation mode of the camera to a normal mode or an illumination apparatus control mode. A display unit selectively displays an image and information. A setting unit sets and changes operating conditions of an illumination apparatus. A communication unit instructs the operating conditions to the illumination apparatus. A control unit controls the mode setting unit to set the operation mode to the illumination apparatus control mode, and changes a display form of the display unit, when predetermined conditions are satisfied. The predetermined conditions include any one of the followings (1) the communication unit is attached to the camera, (2) the communication unit set to an illumination apparatus control mode is attached to the camera, and (3) the communication unit which is incorporated in the camera is set to an illumination apparatus control mode.

4 Claims, 28 Drawing Sheets

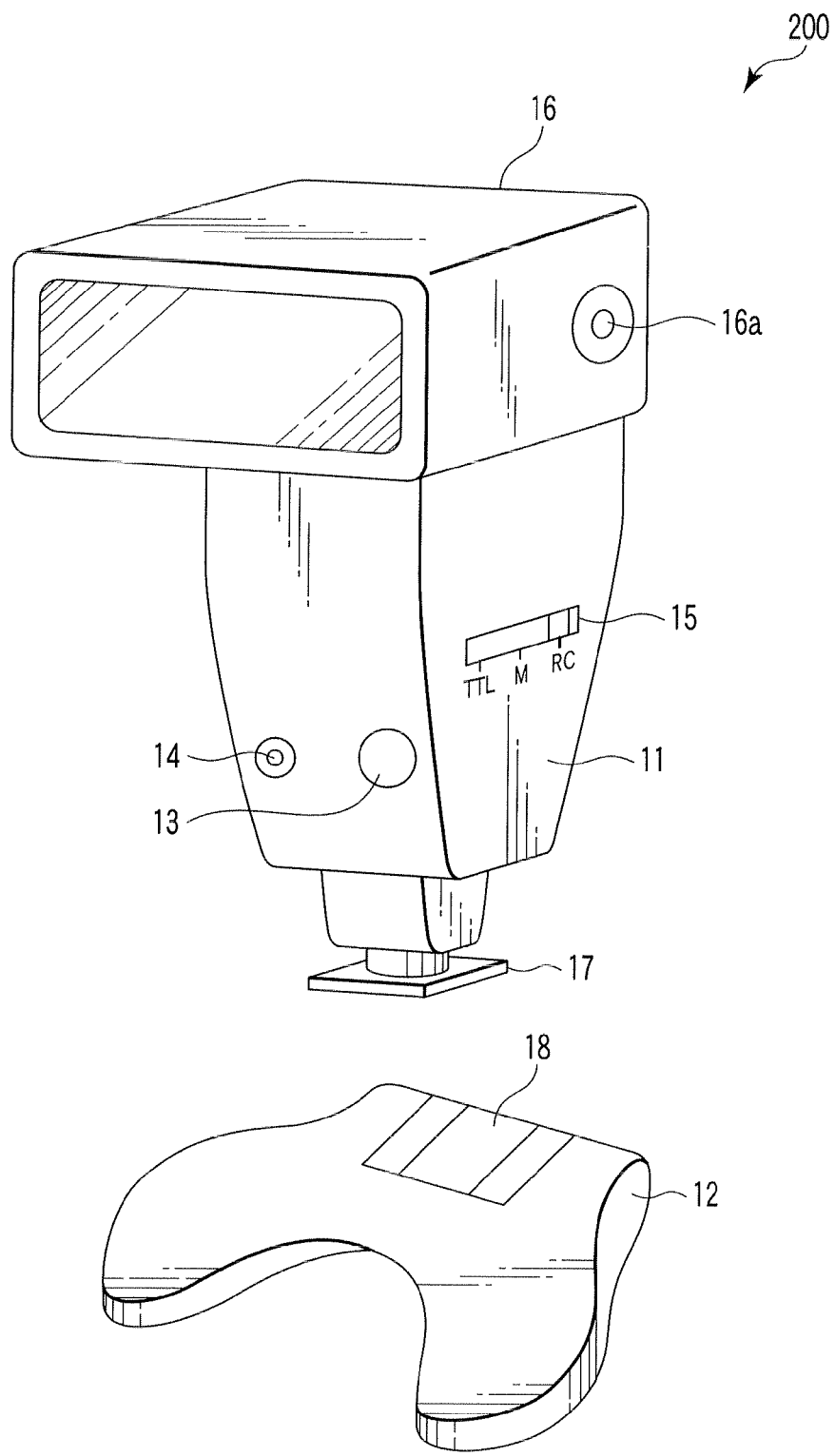
F I G. 2

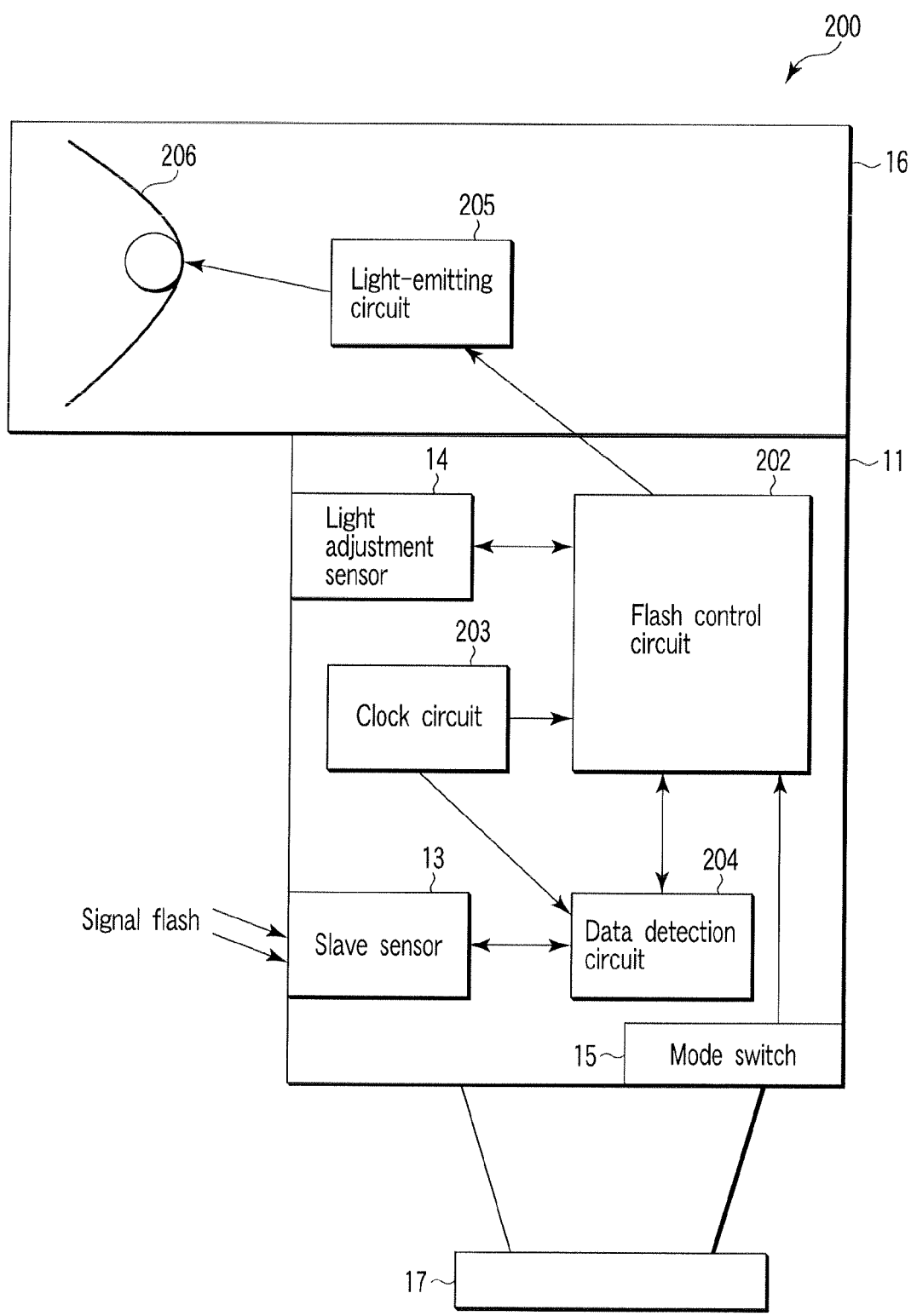
F I G. 5

DSP3

| P | 1/250 F4.5 | | |
|---|---|---|---|
| 2007.05.22 | | | |
| GROUP | MODE | VALUE | FP ON/OFF |
| A | TTL | +1.7 | OFF |
| B | AUTO | +0.5 | CH | 1 |
| C | M | 1/4 | 12 |

↓ Shooting after changing setting

Shooting result confirmation image display 2

After a lapse of 2 seconds, or OK button ON

↓ Shooting without changing setting

Shooting result confirmation image display 1

DSP1(RC mode OFF)

| P | 1/500 F4.5 | | |
|---|---|---|---|
| 2007.05.22 | | | |
| ISO 100 | WB AUTO | FLASH AUTO | PICTURE VIVID |
| AE ESP | AF iESP | FOCUS AF | DRIVE SINGLE |
| XD | HQ | 12 | |

↓ INFO button ON

DSP2(RC mode OFF)

↓ INFO button ON

DSP3(RC mode ON))

| P | 1/250 F4.5 | | | |
|---|---|---|---|---|
| 2007.05.22 | | | | |
| GROUP | MODE | VALUE | FP ON/OFF | |
| A | TTL | +1.7 | OFF | |
| B | AUTO | +0.5 | CH | 1 |
| C | M | 1/4 | 12 | |

INFO button ON

F I G. 24

CAMERA, CAMERA CONTROLLING METHOD, AND RECORDING MEDIUM STORING CAMERA CONTROLLING PROGRAM

CROSS-REFERENCE TO RELATED APPLICATIONS

This application is based upon and claims the benefit of priority from prior Japanese Patent Applications No. 2007-268231, filed Oct. 15, 2007; No. 2007-268232, filed Oct. 15, 2007; No. 2007-268233, filed Oct. 15, 200-7; and No. 2007-268234, filed Oct. 15, 2007, the entire contents of all of which are incorporated herein by reference.

BACKGROUND OF THE INVENTION

1. Field of the Invention

The present invention relates to a camera to take a photograph by using a remote illumination apparatus, a camera controlling method, and a recording medium storing a camera controlling program.

2. Description of the Related Art

There is a known wireless flash system, in which a flash unit as auxiliary illumination for an imaging unit is controlled by wireless communication, such as an optical signal communication control, from another flash unit located at a remote place from the flash unit. In photo-shooting by using such a wireless flash system, lighting of a subject is freely preformed. Further, recently, a digital camera has been widely used as a photographic apparatus, and the result of lighting can be confirmed without developing a film. Therefore, a wireless flash system has been used more and more.

As a technique to easily use the control of the above wireless flash system on a LCD panel of a camera, Jpn. Pat. Appln. KOKAI Publication No. 2000-89308 is known. In the technique disclosed by Jpn. Pat. Appln. KOKAI Publication No. 2000-89308, a wireless flash unit is controlled by a flash unit incorporated in a digital camera, and setting of a wireless flash unit can be done on a LCD panel of a camera.

BRIEF SUMMARY OF THE INVENTION

According to a first aspect of the invention, there is provided a camera to take a photograph by using a remote illumination apparatus, comprising: a mode setting unit which sets an operation mode of the camera to a normal mode or an illumination apparatus control mode; a display unit which selectively displays an image and information; a setting unit which sets and changes operating conditions of the illumination apparatus displayed on the display unit; a communication unit which instructs the operating conditions set by the setting unit to the illumination apparatus by wireless communication, prior to a photographing operation; a control unit which controls the mode setting unit to set the operation mode to the illumination apparatus control mode, and changes a display form of the display unit to permit the setting unit to change the setting of operating conditions of the illumination apparatus, when predetermined conditions are satisfied; wherein the predetermined conditions include any one of the followings: (1) the communication unit is detachable from the camera, and the communication unit is attached to the camera, (2) the communication unit has a communication mode setting unit which sets an operation mode of the communication unit to a normal mode or an illumination apparatus control mode, and the communication unit set to the illumination apparatus control mode by the communication mode setting unit is attached to the camera, and (3) the communication unit is incorporated in the camera, and has a communication mode setting unit which sets the operation mode of the communication unit to a normal mode or an illumination apparatus control mode, and the operation mode of the communication unit is set to the illumination apparatus control mode by the communication mode setting unit.

According to a second aspect of the invention, there is provided a method of controlling a camera to take a photograph by using a remote illumination apparatus, comprising: setting an operation mode of the camera from a normal mode to a illumination apparatus control mode, and changing a display form of a display unit of the camera to permit changing of setting of operating conditions for an illumination apparatus, when any one of the following conditions is satisfied: (1) a communication unit, which is detachable from the camera, and instructs operating conditions of the illumination apparatus set in the camera to the illumination apparatus by wireless communication, is attached to the camera, (2) a communication unit, which is detachable from the camera, and instructs operating conditions of the illumination apparatus set in the camera to the illumination apparatus by wireless communication, is attached to the camera being set to an illumination apparatus control mode, and (3) a communication unit, which is incorporated in the camera, and instructs operating conditions of the illumination apparatus set in the camera to the illumination apparatus by wireless communication, is set to an illumination apparatus control mode.

According to a third aspect of the invention, there is provided a computer readable recording medium storing a program for controlling a camera to take a photograph by using a remote illumination apparatus, the program enabling a computer to execute the following: a function of setting an operation mode of the camera from a normal mode to a illumination apparatus control mode, and changing a display form of a display unit of the camera to permit changing of setting of operating conditions for an illumination apparatus, when any one of the following conditions is satisfied: (1) a communication unit, which is detachable from the camera, and instructs operating conditions of the illumination apparatus set in the camera to the illumination apparatus by wireless communication, is attached to the camera, (2) a communication unit, which is detachable from the camera, and instructs operating conditions of the illumination apparatus set in the camera to the illumination apparatus by wireless communication, is attached to the camera being set to an illumination apparatus control mode, and (3) a communication unit, which is incorporated in the camera, and instructs operating conditions of the illumination apparatus set in the camera to the illumination apparatus by wireless communication, is set to an illumination apparatus control mode.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an external view of an external flash unit according to a first embodiment of the invention;

FIG. 5 is an internal circuit diagram of an external flash unit;

FIG. 17 is a fifth flowchart of operations of an external flash unit in RC mode of;

FIG. 24 is a diagram showing transition of screens of a rear LCD panel of a camera in a photography standby state in a fourth embodiment;

DETAILED DESCRIPTION OF THE INVENTION

Hereinafter, embodiments of the invention will be explained with reference to the accompanying drawings.

Embodiment 1

Figure 1A:
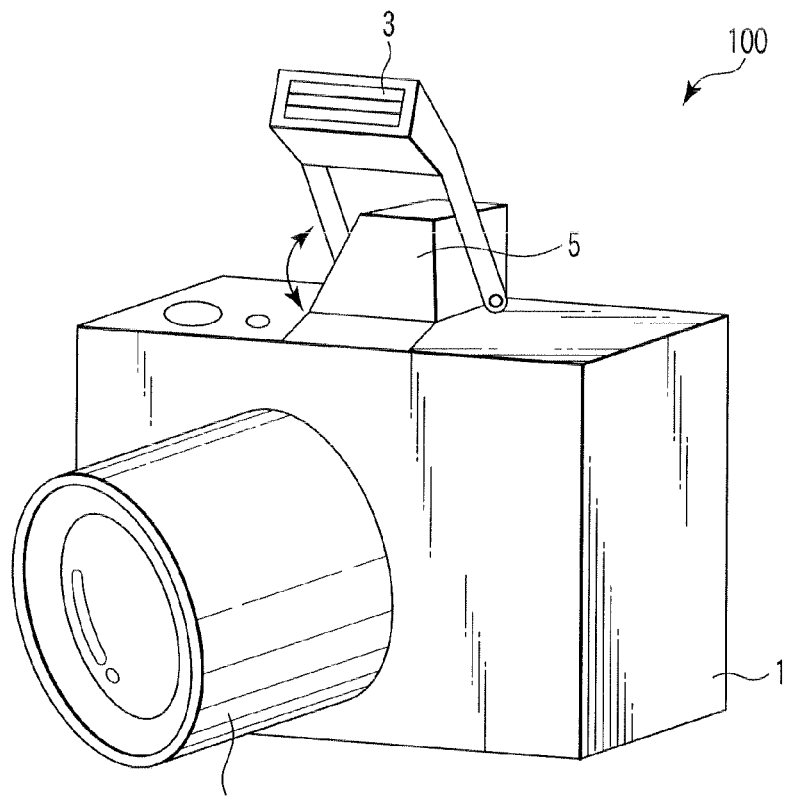
FIGS. 1A and 1B are external views of a camera according to a first embodiment of the invention.
Figure 1B:
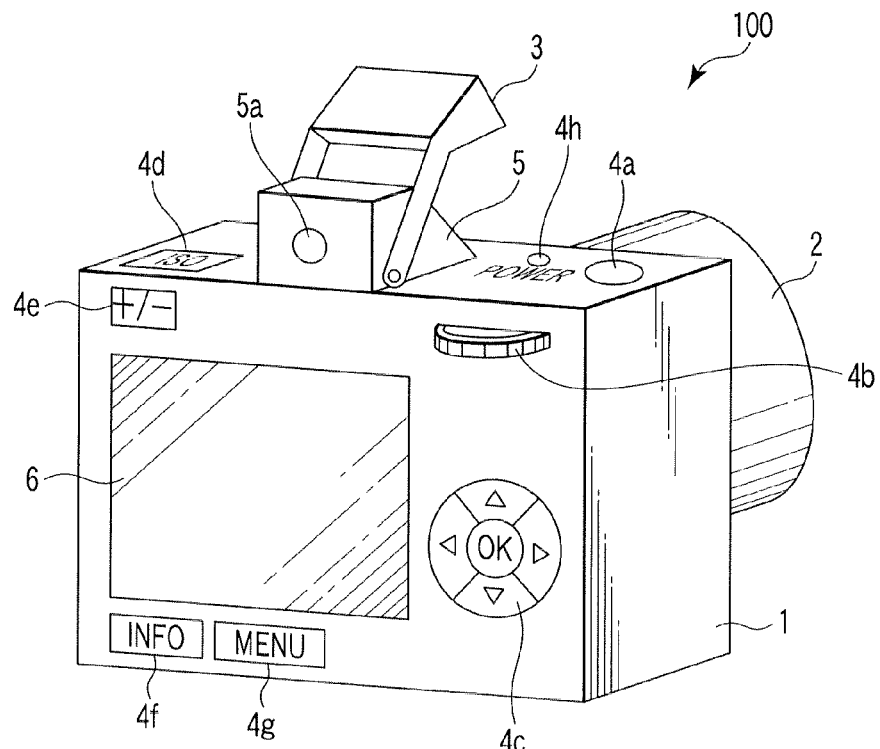

A first embodiment will be explained first. FIGS. 1A and 1B show external views of a camera according to a first embodiment. FIG. 1A shows an upper perspective view of a camera. FIG. 1B shows a rear perspective view of a camera.

The camera shown in FIGS. 1A and 1B is a single-lens reflex camera. A camera 100 has a camera body 1, and a lens unit 2 detachable from the camera body 1. When the lens unit 2 is attached to the camera body 1, the lens unit 2 is interlocked with the camera body 1. In this embodiment, the camera 100 functions as a master flash unit in a wireless flash system to be explained later.

As shown in FIGS. 1A and 1B, the camera body 1 is provided with a built-in flash 3, operation members 4a to 4h, a finder unit 5, and a rear LCD panel 6.

The built-in flash 3 includes a light-emitting part and a light-emitting circuit. The light emitting part includes a xenon (Xe) flashtube. The light-emitting circuit is a circuit to light the light-emitting part. The built-in flash 3 is a pop-up type internal flash, which is usually housed in the camera body 1. The built-in flash 3 pops up as shown in FIG. 1A, when emitting a flash.

The operation members 4a to 4h are members to be operated by the user for operating the camera 100. The operation member 4a is a release button. The release button 4a is a member to operate a two-step switch consisting of a first release switch that is turned on when depressed to a half depth, and a second release switch that is turned on when depressed to a full depth. When the first release switch is turned on, preparations for photo-shooting, such as automatic focus control (AF) and automatic exposure control (AE), are executed. When the second release switch is turned on, photo-shooting is executed. The operation member 4b is an electronic dial. The electronic dial 4b is a member used to change setting of various values. The operation member 4c is a cross button. The cross button 4c consists of up, down, left and right buttons, and a center OK button. The cross button 4c is a member used to select and determine items of a camera menu when the menu is opened. The operation member 4d is an ISO button. The ISO button 4d is a member to change the ISO sensitivity of an imaging element when taking a picture. The ISO button 4d is used together with the electronic dial 4b. The ISO sensitivity can be set by turning the electronic dial 4b while pressing the ISO button 4d. The operation member 4e is an exposure correction button. The exposure correction button 4e is used together with the electronic dial 4b. An exposure correction value can be set by turning the electronic dial 4b while pressing the exposure correction button 4e. The operation member 4f is an INFO button. The INFO button 4f selects display modes (described in detail later) of the rear LCD panel 6. The operation member 4g is a MENU button. When the MENU button 4g is pressed, a menu screen for setting various items appears on the rear LCD panel 6. The operation member 4h is a power button. The power button 4h turns on and off the camera 100.

The finder unit 5 is an optical finder unit for observing a subject. The finder unit 5 is configured to observe light passing optics inside the lens unit 2, through an eyepiece 5a by using optics such as a mirror and a pentagonal prism provided inside the camera body 1.

The rear LCD panel 6 is provided at the rear of the camera body 1. The rear LCD panel 6 is a display unit for displaying various images, such as acquired images, live view images, menu screen, various information and settings.

FIG. 2 is an external view of an illumination apparatus (an external flash unit) constituting a wireless flash system according to this embodiment. An external flash unit functions as a slave flash unit in the wireless flash system to be explained later.

An external flash unit 200 shown in FIG. 2 has a flash main unit 11. A hot shoe 17 is provided at the bottom of the flash main unit 11. The flash main unit 11 is fixed to a flash stand 12, by inserting the hot shoe 17 into a hot shoe plate 18 provided in the flash stand 12. The flash main unit 11 can also be fixed to a hot shoe plate of the camera 100. In this case, the external flash unit 200 can be used as a light source for emitting a flash, instead of the built-in flash 3.

Further, as shown in FIG. 2, the flash main unit 11 is provided with a slave sensor 13, a light adjustment sensor 14, and a mode switch 15. A rotatable light-emitting unit 16 is fixed to the flash main unit 11.

When the external flash unit 200 is used as a slave flash unit, the slave sensor 13 receives a signal flash from the camera 100 as a master flash unit, and generates an electrical signal by photoelectrically converting the received signal flash.

The light adjustment sensor 14 is a sensor for adjusting the flash. In the wireless flash system described later, light adjustment is possible in two modes, TTL light adjustment and flash adjustment. In the TTL light adjustment, light of an external flash unit is adjusted by using a TTL sensor of a camera. In the flash adjustment, the flash of an external flash unit is adjusted by using a sensor of an external flash unit. The light adjustment sensor 14 is a sensor used for the flash adjustment. The light adjustment sensor 14 receives a reflected flash from a subject at pre-light emission to a subject before photo-shooting, and generates an electrical signal by photoelectrically converting the received reflected light.

The mode switch 15 is a switch to set an operation mode of the external flash unit 200. The operation mode includes three modes of "TTL", "M" and "RC". The TTL (Through The Lens) and M (Manual) modes are normal modes used when the flash main unit 11 is attached to the camera 100. The TTL mode is selected when the TTL sensor of a camera is used for adjustment of light. The M mode is selected when the light adjustment sensor 14 of the external flash unit 200 is used for adjustment of light. The RC (Remote control) mode is an illumination apparatus control mode selected when the external flash unit 200 is used as a slave flash unit.

The light-emitting unit 16 is a flash-emitting part in the external flash unit 200. The light-emitting unit 16 is provided with a lock release button 16a. While the lock release button 16a is being pressed, the light-emitting unit 16 can be rotated with respect to the flash main unit 11. By rotating the light-emitting unit 16 in the up-down and left-right directions while pressing the lock release button 16a, the user can change the direction of the light-emitting unit 16, that is, the direction of the flash.

Figure 3:
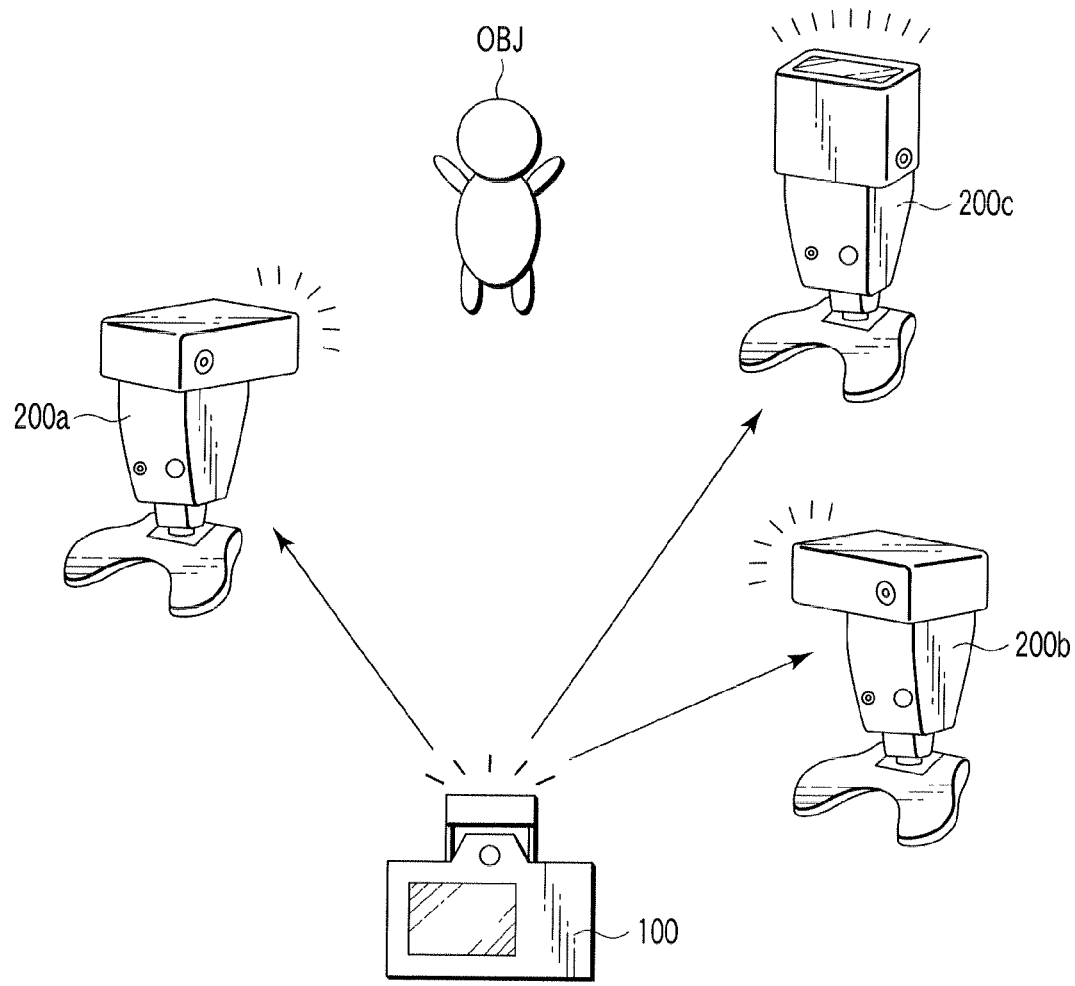
FIG. 3 is a diagram showing the configuration of a wireless flash system according to a first embodiment of the invention.

FIG. 3 is a diagram showing the configuration of a wireless flash system according to this embodiment, using the camera and external flash unit shown in FIGS. 1 and 2.

In the example of FIG. 3, a subject OBJ exists in front of the camera 100 as a master flash. External flash units 200a to 200c assigned to different groups are placed as slave flash units for the subject OBJ. Among these three external flash units, the external flash unit 200a is a flash unit of a group A, the external flash unit 200b is a flash unit of a group B, and the external flash unit 200c is a flash unit of a group C. In these external flash units, the mode switch 15 is set to the "RC" position.

In the above configuration, each external flash unit controls emission of light according to a signal flash from the camera 100. In the example of FIG. 3, one external flash unit belongs to one group. Two or more external flash units may be assigned to one group. In this case, the external flash units belonging to the same group perform the same light emission control.

Figure 4:
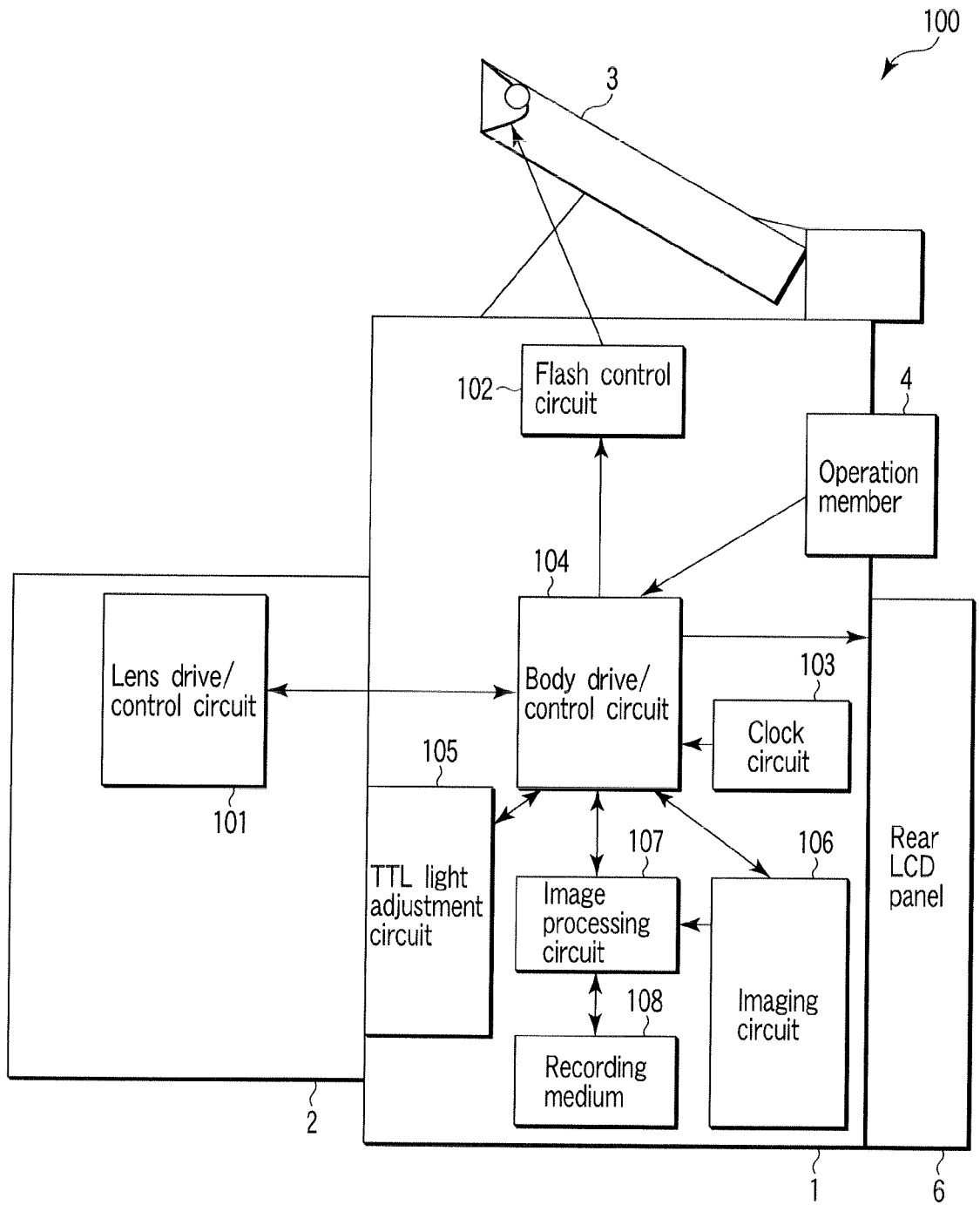
FIG. 4 is an internal circuit diagram of a camera.

Hereinafter, the wireless flash system according to this embodiment will be explained further. FIG. 4 is an internal circuit diagram of the camera shown in FIG. 1. The same components as in FIG. 1 are given the same reference numbers, and an explanation on these components will be omitted.

As shown in FIG. 4, the lens unit 2 has a lens drive/control circuit 101. The lens drive/control circuit 101 drives and controls a focus of a lens and an aperture (not-shown) lens provided inside the lens unit 2, based on the instruction from the body drive/control circuit 104 of the camera body 1.

As shown in FIG. 4, the camera body 1 has a flash control circuit 102, a clock circuit 103, a body drive/control circuit 104, a TTL light adjustment circuit 105, an imaging circuit 106, an image processing circuit 107, and a recording medium 108. The body drive/control circuit 104 is connected to the operation members 4 provided on the outside of the camera body 1 (the operation members 4a to 4h shown in FIG. 1), and the rear LCD panel 6.

The flash control circuit 102 controls emission of light of the built-in flash 3 under the control of the body drive/control circuit 104.

The clock circuit 103 is a clock oscillation circuit using a crystal oscillator, for example. The clock circuit 103 generates a clock signal for operating the body drive/control circuit 104. Generally, many parts used in the camera body 1 require high-precision time control, and the clock circuit 103 is desirably configured as a high-precision crystal oscillator circuit, though it is expensive.

The body drive/control circuit 104 is a digital Circuit operated according to a clock signal generated in the clock circuit 103. The body drive/control circuit 14 controls the operations of the blocks in the camera body 1 and the lens drive/control circuit 101 in the lens unit 2, according to the operations of the operation members 4. Further, when wireless flash photography is executed in this embodiment, the body drive/control circuit 104 gives a light-emitting instruction to the flash control circuit 102 for wireless data communication with an external flash unit.

The TTL light adjustment circuit 105 is a light adjustment circuit to determine the amount of full-light emission from the built-in flash 3. At pre-light emission (emitting a small amount of light before photo-shooting to determine the amount of flash for photo-shooting), the TTL light adjustment circuit 105 measures a reflected flash from a subject through a not-shown lens in the lens unit 2. The body drive/control circuit 104 determines the amount of full-light emission from the built-in flash 3 (the amount of flash for photo-shooting), based on the result of light measurement in the TTL light adjustment circuit 105.

The imaging circuit 106 includes an imaging element and an imaging element driving circuit. The imaging circuit 106 receives the light from a subject through a not-shown lens in the lens unit 2, and generates an electrical signal (an image signal) by photoelectrically converting the received reflected light. The imaging circuit 106 converts the image signal into a digital signal (image data), and outputs the digital signal to the image processing circuit 107.

In photo-shooting, the image processing circuit 107 digitally processes an image obtained from the imaging circuit 106, and records the image on the recording medium 108. When reproducing an image, the image processing circuit 107 reads image data recorded on the recording medium 108, and generates data for displaying on the rear LCD panel 6, from the read image data.

FIG. 5 is an internal circuit diagram of the external flash unit shown in FIG. 2. The same components as in FIG. 2 are given the same reference numbers, and an explanation on these components will be omitted.

As shown in FIG. 5, the flash main unit 11 has a flash control circuit 202, a clock circuit 203, and a data detection circuit 204. The flash control circuit 202 is connected to the light adjustment sensor 14 and mode switch 15 provided on the outside of the flash main unit 11. The data detection circuit 204 is connected to the slave sensor 13.

The flash control circuit 202 controls flash emission) and other operations, according to the information from the sensors such as slave sensor 13 and light adjustment sensor 14, and operations of the mode switch 15.

The clock circuit 203 generates a clock signal for operating the digital part of the flash control circuit 202. A clock signal is also used as a reference clock signal for measuring the pulse interval of the signal flash received by the slave sensor 13 in the data detection circuit 204. The external flash unit 200 has less number of functions requiring high-precision time control, than the camera 100. Therefore, the clock circuit 203 may be an inexpensive circuit using a ceramic oscillator.

The data detection circuit 204 counts the pulse interval of the signal flash output from the slave sensor 13 by using a clock signal from the clock circuit 203, and outputs the counted data to the flash control circuit 202 as the control data from the camera 100.

Further, as shown in FIG. 5, the light-emitting unit 16 has a light-emitting circuit 205 and a flash-emitting part 206. The light-emitting circuit 205 includes a capacitor, and charges the energy for lighting the flash-emitting part 206, and causes the flash-emitting part 206 to emit a flash, based on the instruction from the flash control circuit 202. The flash-emitting part 206 is a light-emitting part includes a xenon (Xe) flashtube, for example.

Figure 6:
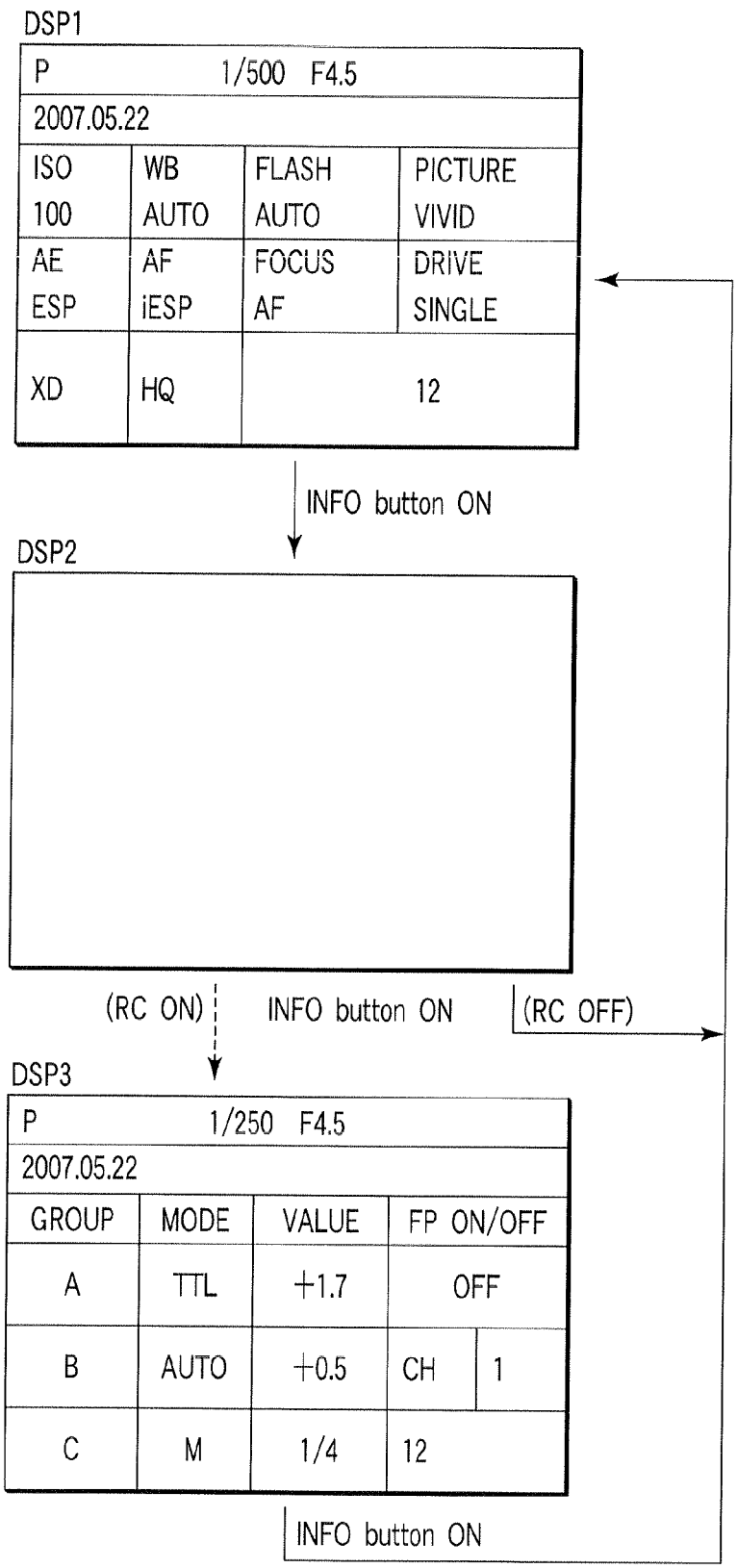
FIG. 6 is a diagram showing transition of screens in a photography standby state of a rear LCD panel of a camera functioning as a master flash unit.

FIG. 6 is a diagram showing transition of screens in a photography standby state of the rear LCD panel 6 of the camera 100 functioning as a master flash unit. The displays shown in FIG. 6 are switched each time the INFO button 4f is pressed.

The DSP 1 is a screen for normal photography. The DSP 1 displays the items often confirmed in normal photography (a shooting mode, date, ISO sensitivity, white balance setting, flash setting, image processing setting, light measuring mode setting, distance measuring mode setting, AF (auto focus)/MF (manual focus) setting, single/continuous shooting mode setting, kinds of the current recording medium 108, image quality mode setting, and number of residual exposures). Setting items are selected and determined by the cross button 4c, while the items are being displayed. The setting items can be changed on the display unit.

The DSP 2 is a screen when the rear LCD panel 6 is turned off. The rear LCD panel 6 is turned off when saving the power consumption or when the light from the rear LCD panel 6 interferes viewing a finder.

The DSP3 is a screen dedicated to wireless flash photography. The DSP3 is displayed only when a wireless flash control mode (hereinafter, this mode is called a RC mode) is selected on a not-shown menu screen. The DSP 3 displays setting of a slave flash for each group shown in FIG. 3 (setting of the light adjustment mode and the amount of flash in the example of FIG. 6) and ON/OFF of high-speed simultaneous light emission (FP), and the operating conditions of a communication channel used for wireless flash photography, like a matrix. Further, as in the DSP 1, the operating conditions of each external flash unit can be changed by the cross button 4c, while monitoring the display of the DSP 3.

As described above, the screen of the DSP 3 can be changed only when the RC mode is selected. When the RC mode is not selected, the DSP 3 is not obtained, and only DSP 1 and DSP 2 can be changed. When the RC mode is selected, wireless flash photography is possible in any one of DSP1, DSP2 and DSP3.

Figure 7:
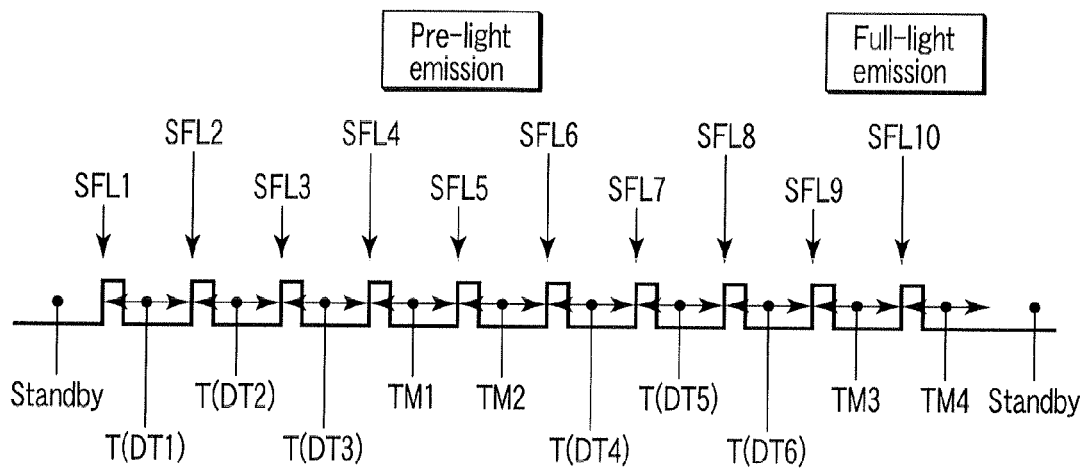
FIG. 7 is a diagram showing a form of wireless communication using the flash of a wireless flash system.

Hereinafter, wireless flash photography will be explained. FIG. 7 is a diagram showing a form of wireless communication using a flash of the wireless flash system shown in FIG. 3.

In this embodiment, the camera 100 functioning as a master flash unit emits light ten times for one time photo-shooting. Among ten times of light emission, the first time light emission is assumed as SFL1, the light emission at and after the second time are assumed as SFL2, . . . , SFL10. The light emission interval between SFL1, and SFL2 is assumed as T(DT1). The subsequent light emission intervals are assumed as T(DT2), T(DT3), TM 1, TM 2, T(DT4), T(DT5), T(DT6), TM3, and TM4, respectively. In this example, an external flash unit functioning as a slave flash unit emits pre-light in synchronization with SFL5, and emits full-light in synchronization with SFL10.

The data detection circuit 204 counts each light emission interval by using a clock signal from the clock circuit 203, and outputs the counted data to the flash control circuit 202 as control data from the camera 100.

In the period T(DT1), the data detection circuit 204 sends data common to each group, such as a communication channel and ON/OFF setting of high-speed simultaneous light emission. In the following periods T(DT2) and T(DT3), the data detection circuit 204 sends data about light emission mode (TTL/AUTO/M) of each group. The data DT1, DT2 and DT3 taken by the data detection circuit 204 in each period consist of 3-bit data. Each data is expressed with a light emission interval obtained by adding 0.5 ms per bit to a 5 ms offset.

In the T(DT4), T(DT5) and T(DT6) periods, the data detection circuit 204 sends the data corresponding to the amount of light emitted in each group. The data DT4, DT5 and DT6 taken by the data detection circuit 204 in each period consist of 5-bit data. Each data is expressed at a light emission interval obtained by adding 0.25 ms per bit to a 5 ms offset.

As described above, in this embodiment, the data corresponding to a channel and light emission mode consists of less bits than the data corresponding to the amount of flash or the aperture value of the camera and ISO sensitivity for determining the amount of light emission, and the time resolution of the data is set two times coarse, in other words, the time error tolerance is set to two times.

Any data is formed by adding the time corresponding to each data to the predetermined 5 ms offset time. In this case, T(DT1), T(DT2) and T(DT3) are 5 ms at the shortest (when the data is 0), and 8.5 ms at the longest (when the data is 7). T(DT4), T(DT5) and T(DT6) are 5 ms at the shortest (when the data is 0), and 12.75 ms at the longest (when the data is 31).

Figure 8:
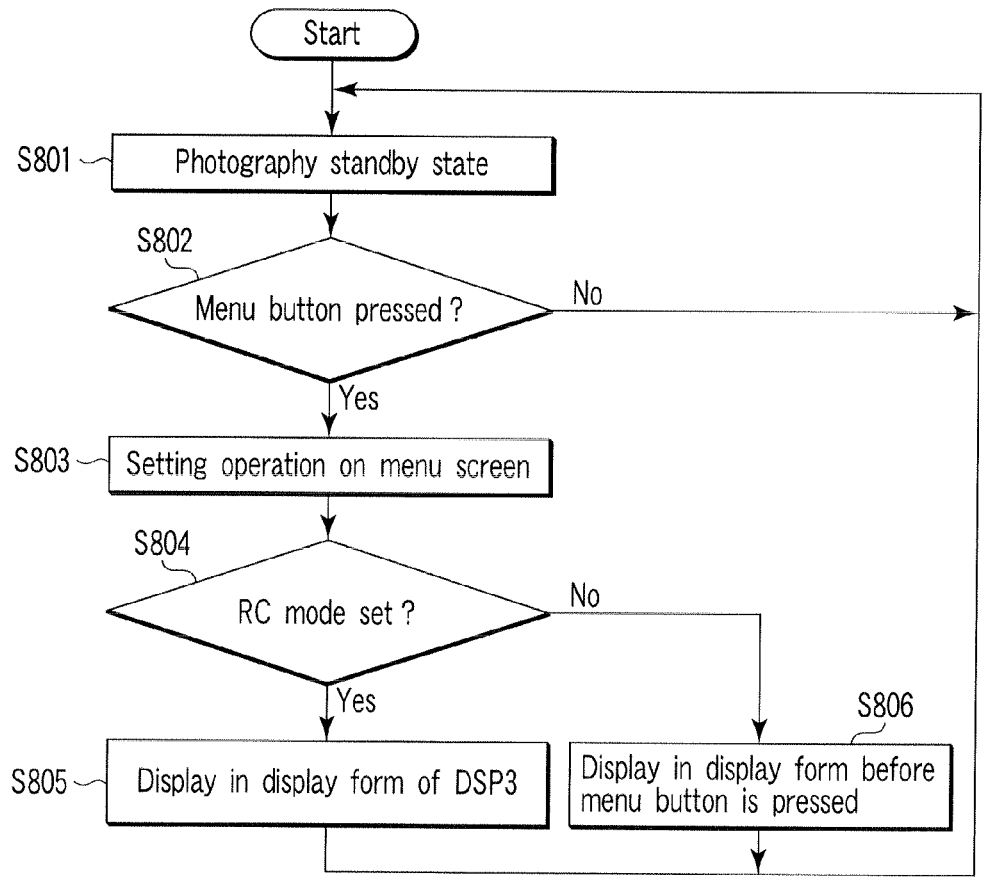
FIG. 8 is a flowchart of operations in a photography standby state in RC mode of a camera.
Figure 9:
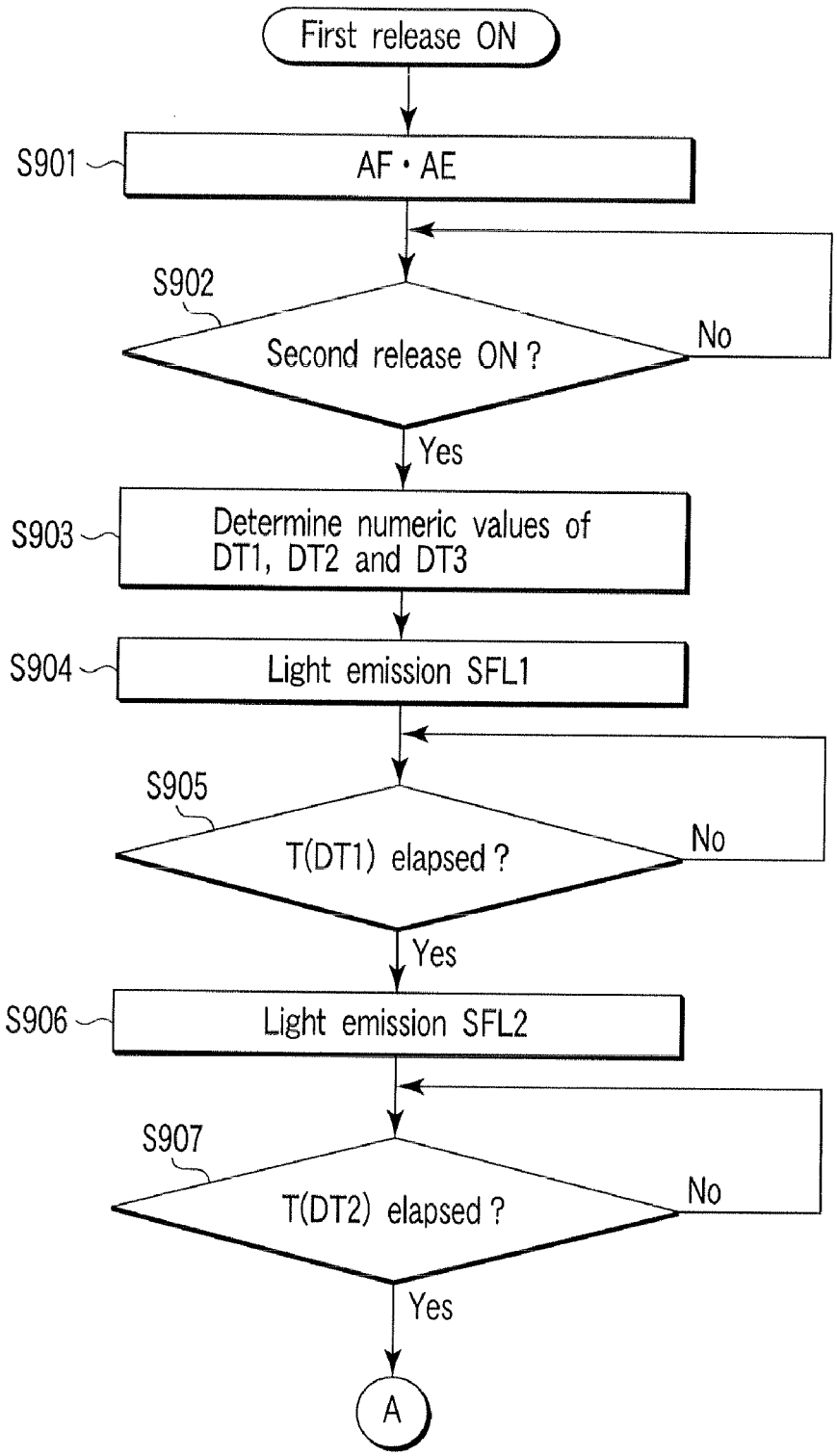
FIG. 9 is a first flowchart of photography control in RC mode of a camera.
Figure 10:
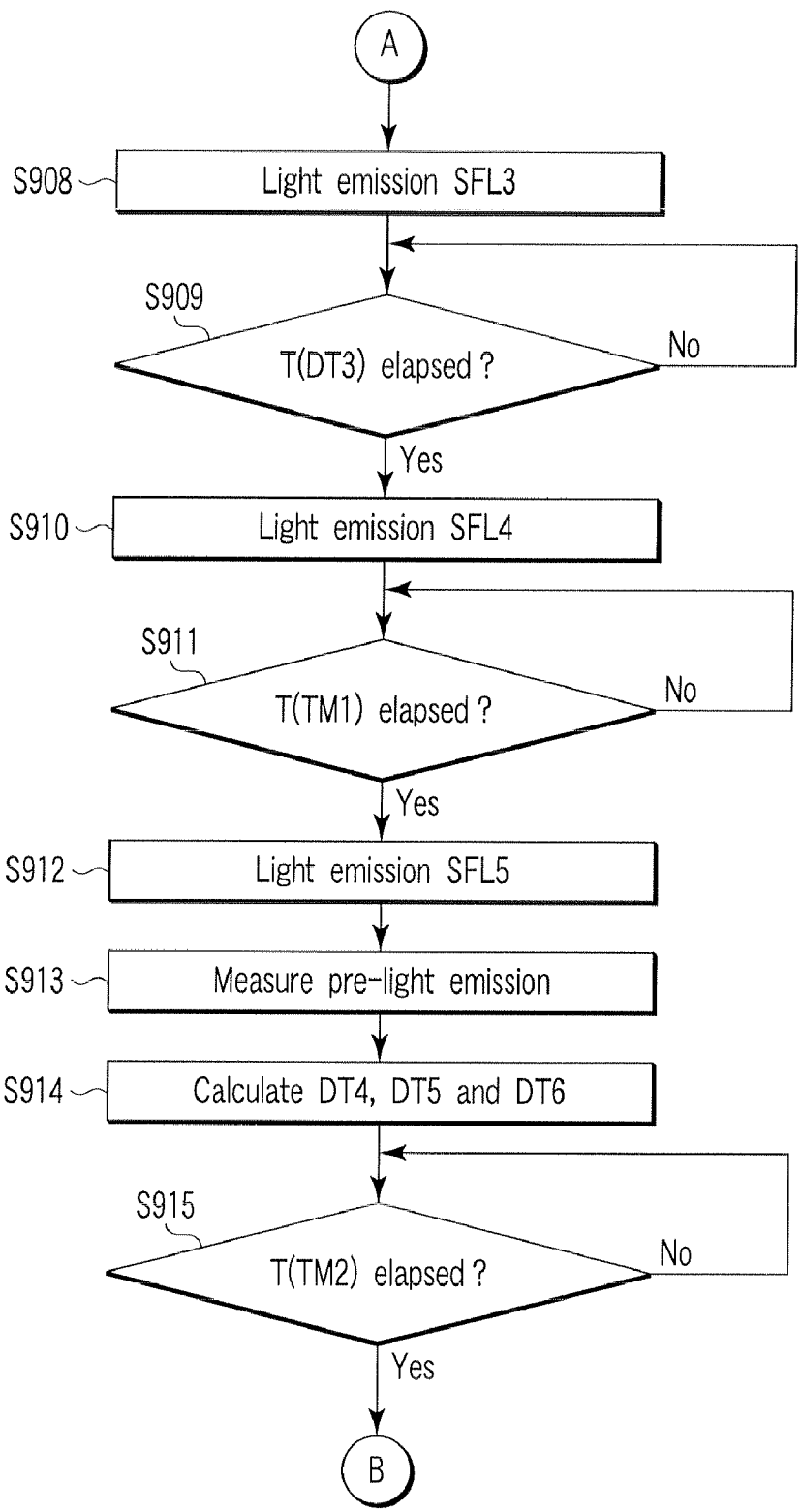
FIG. 10 is a second flowchart of photography control in RC mode of a camera.
Figure 11:
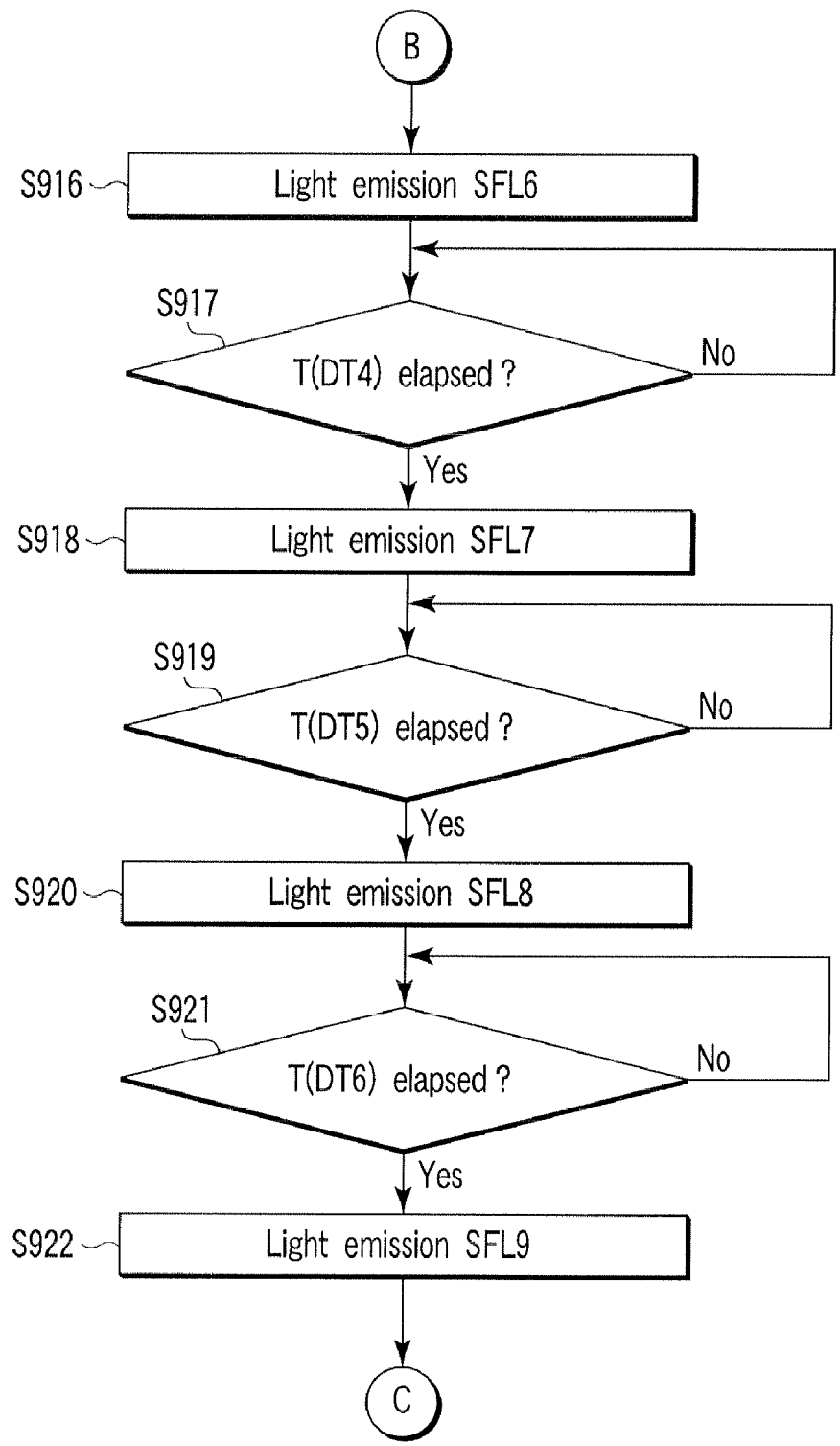
FIG. 11 is a third flowchart of photography control in RC mode of a camera.
Figure 12:
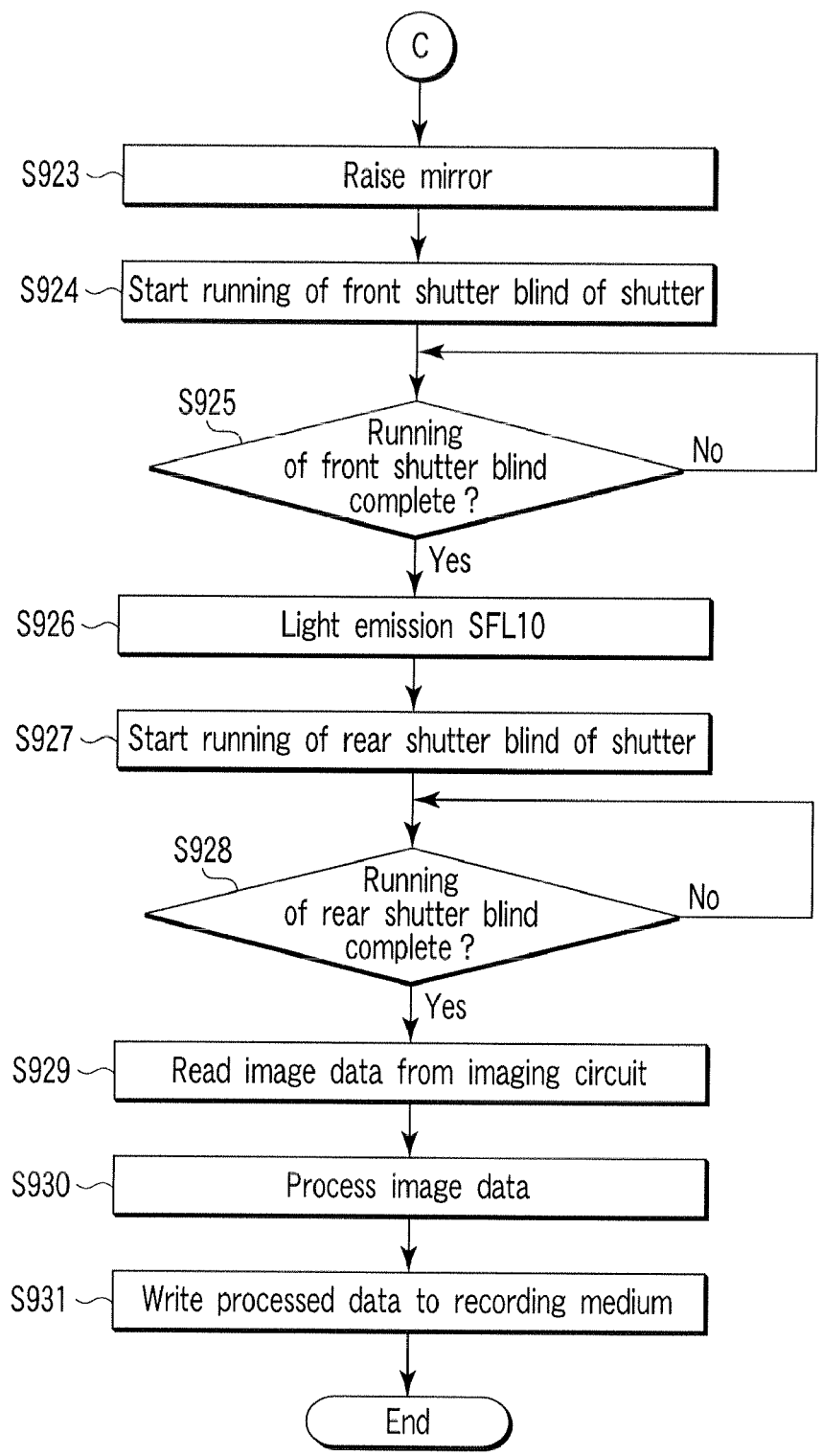
FIG. 12 is a fourth flowchart of photography control in RC mode of a camera.
Figure 13:
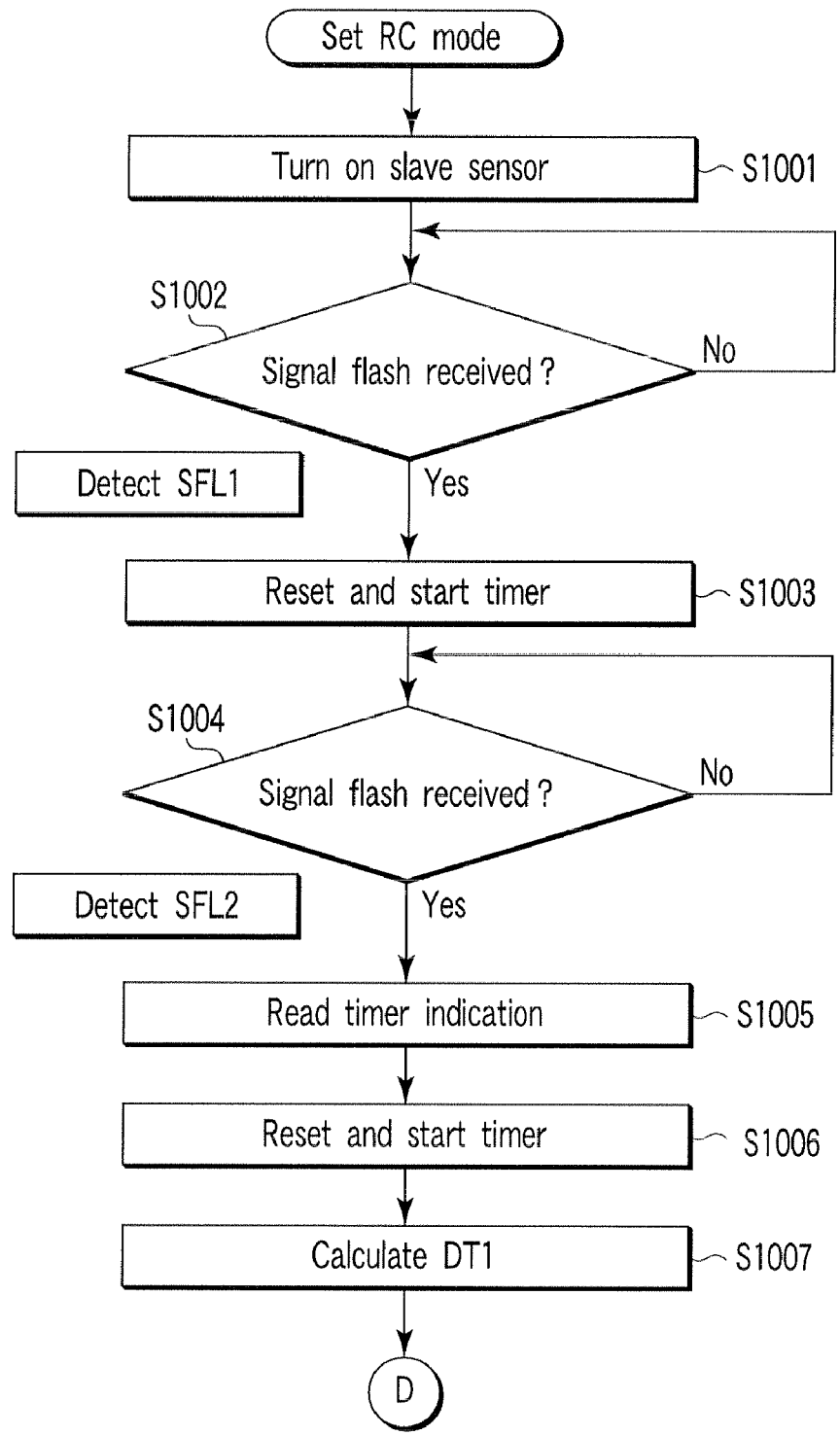
FIG. 13 is a first flowchart of operations of an external flash unit in RC mode.
Figure 14:
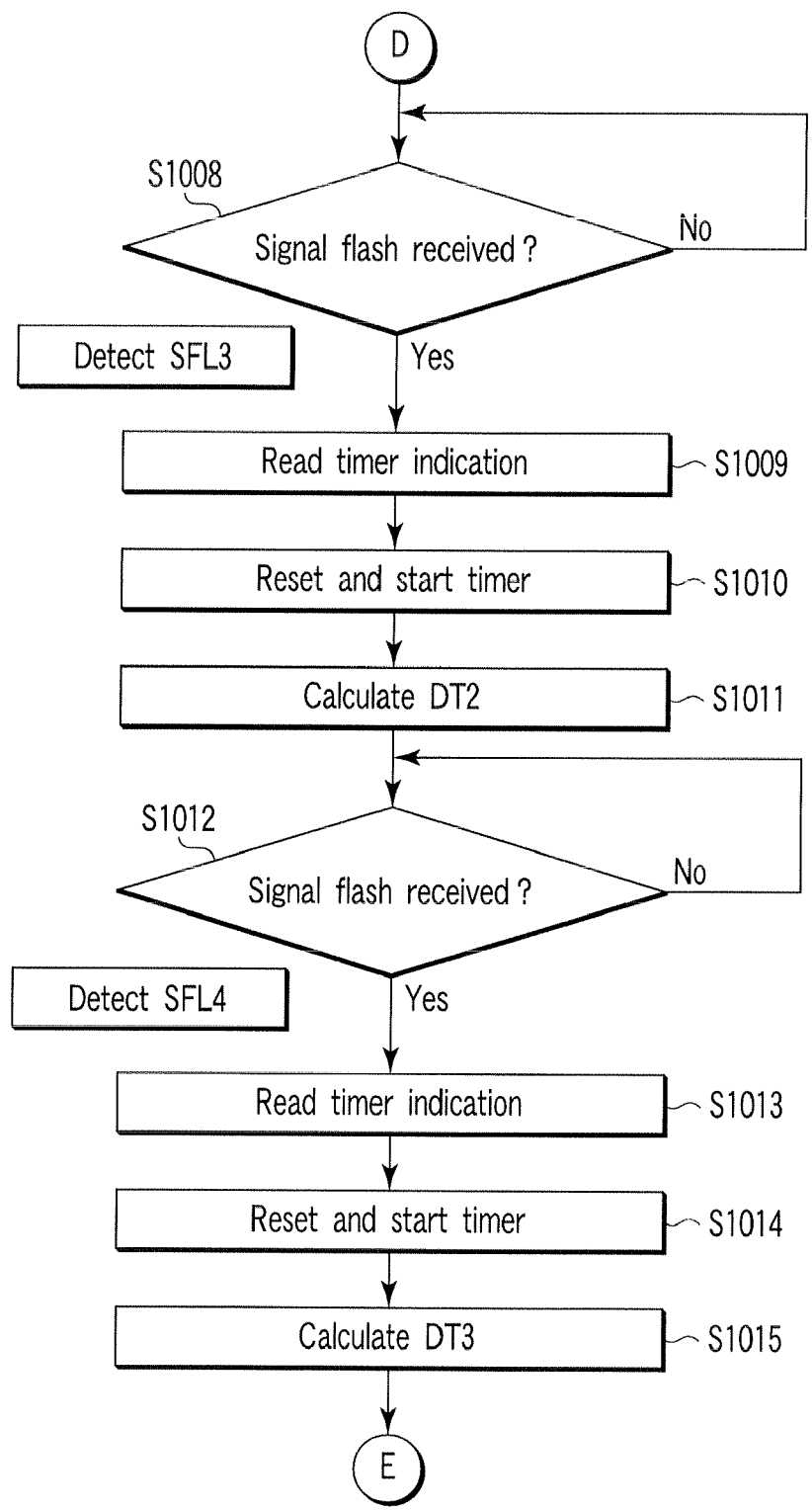
FIG. 14 is a second flowchart of operations of an external flash unit in RC mode.
Figure 15:
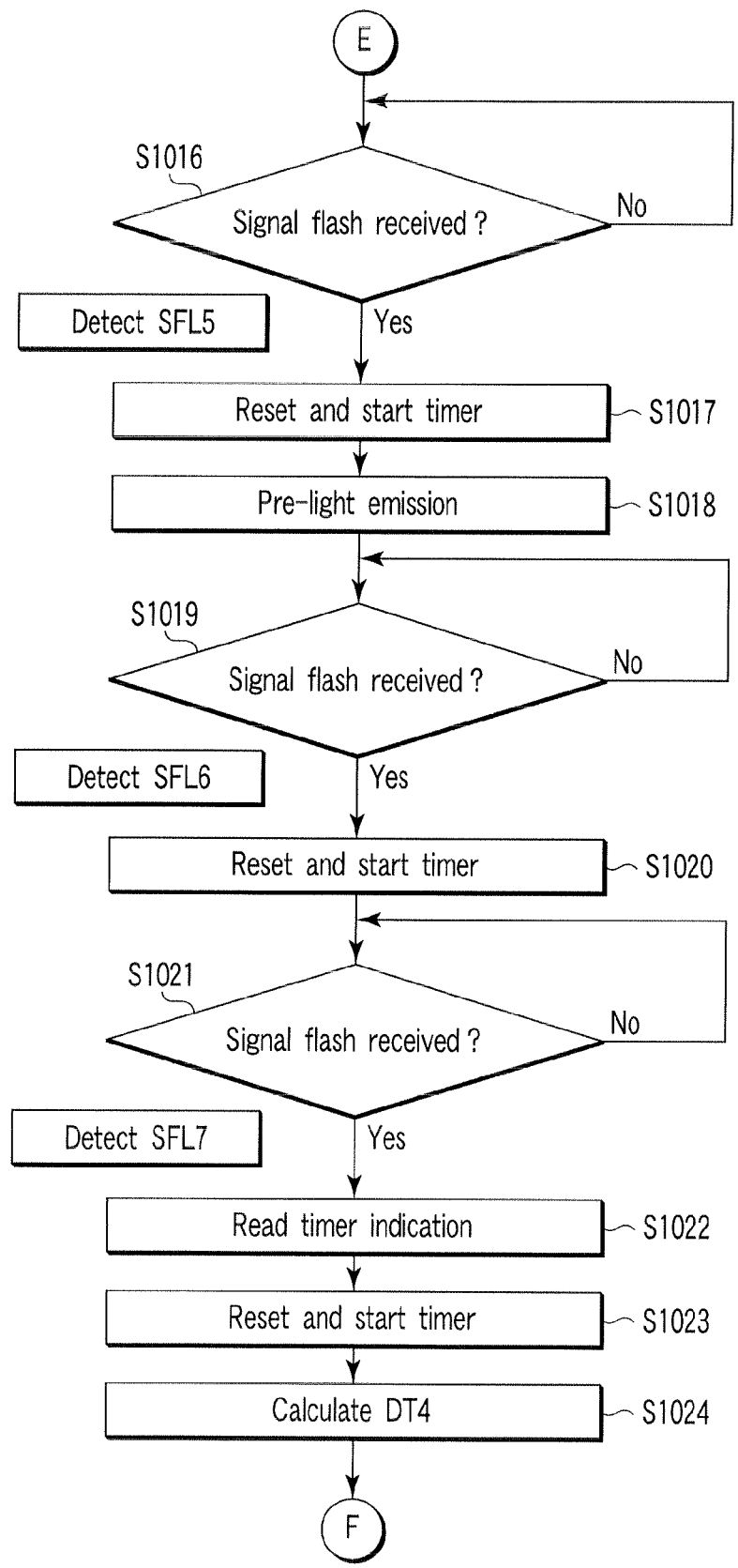
FIG. 15 is a third flowchart of operations of an external flash unit in RC mode.
Figure 16:
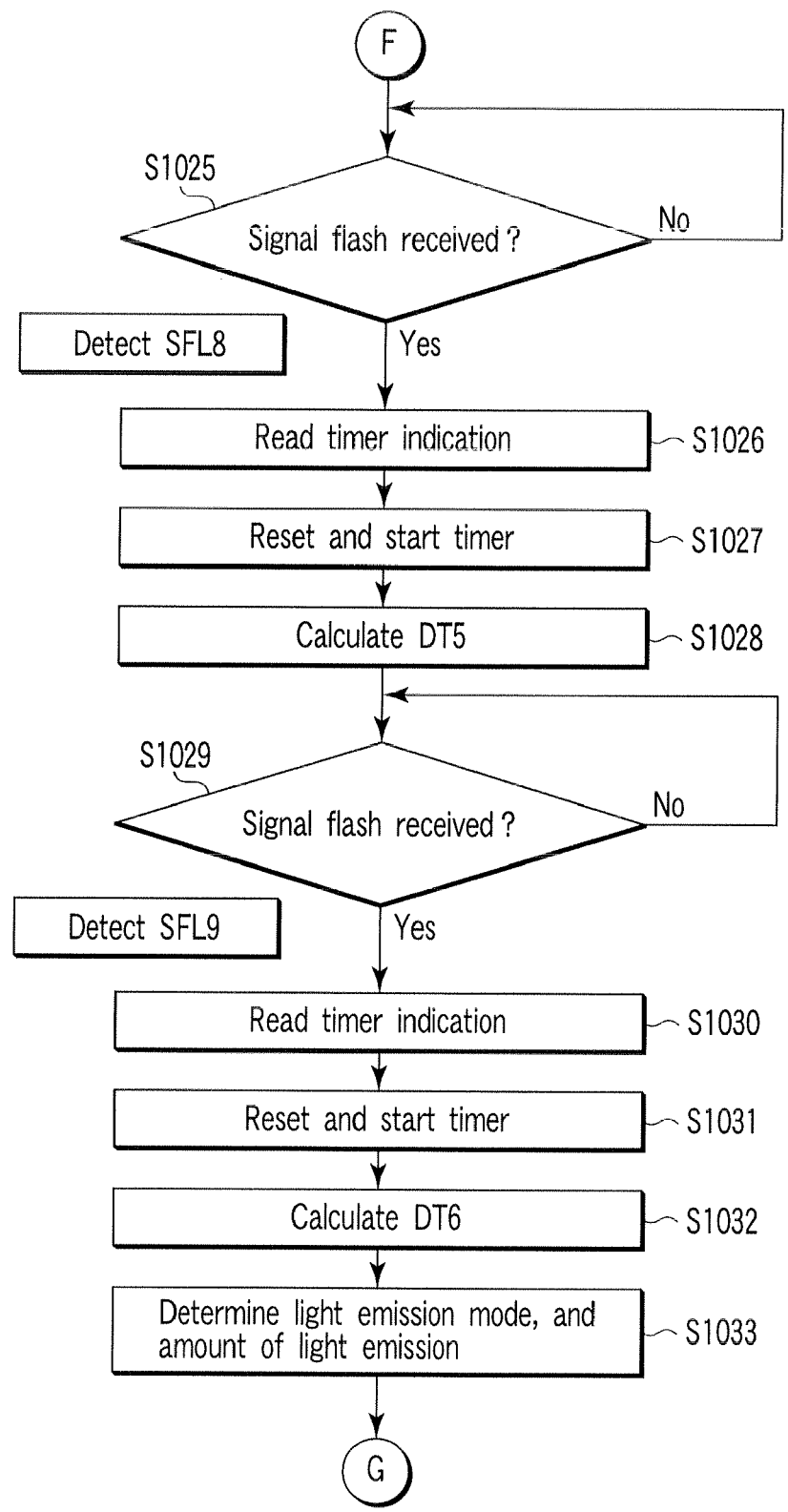
FIG. 16 is a fourth flowchart of operations of an external flash unit in RC mode.
Figure 17:
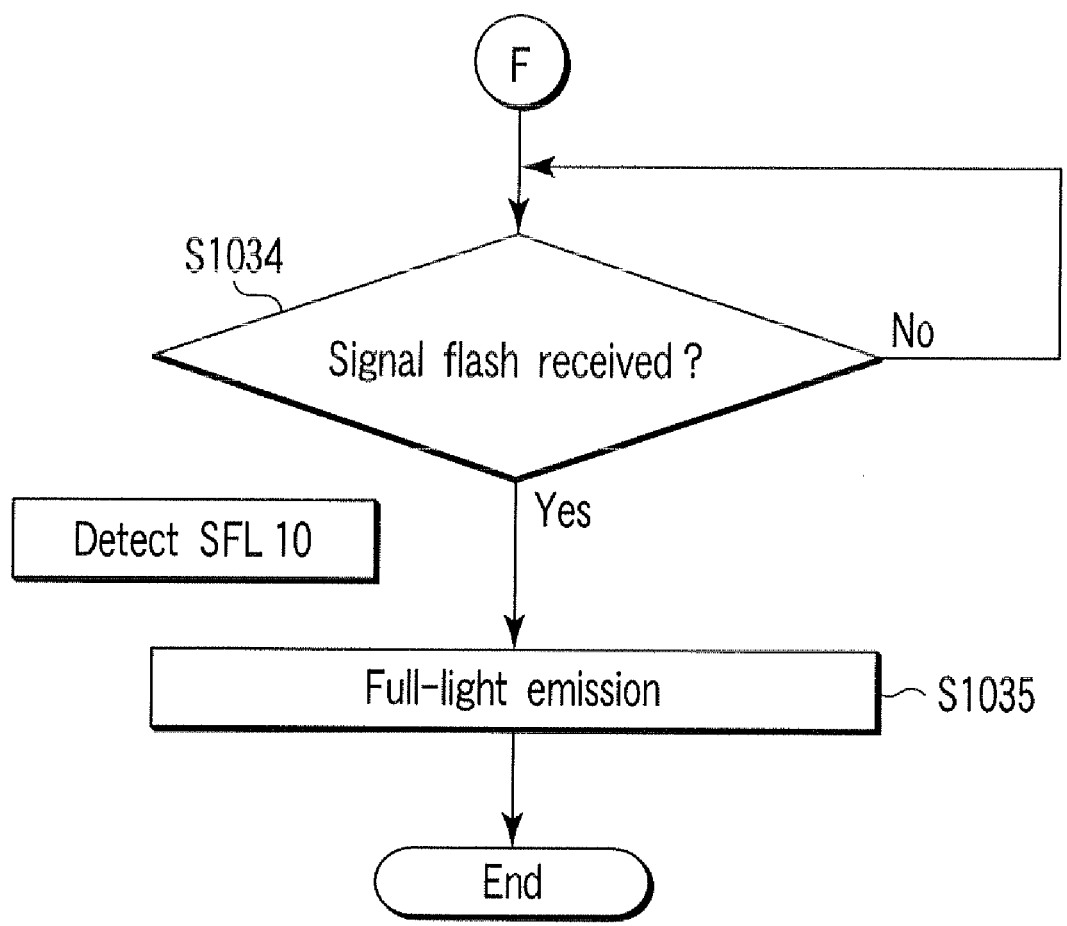

FIG. 8 is a flowchart of operations in the photography standby state in the RC mode of the camera 100 functioning as a master flash in the wireless flash system shown in FIG. 3.

The operation of FIG. 8 is started when the camera 100 is turned on by pressing the power button 4h. When the camera 100 is turned on by pressing the power button 4h, the camera is set ready for photo-shooting (step S801). In this standby state, the body drive/control circuit 104 determines whether the menu button 4g is operated by the user (step S802). The body drive/control circuit 104 keeps the standby state until the menu button 4g is operated in step S802.

When the menu button 4g is operated in step S802, the body drive/control circuit 104 displays the menu screen on the rear LCD panel 6. Thereafter, the setting is changed on the menu screen according to the operation of the cross button 4c by the user (step S803). When the user selects a menu item or changes the setting, the body drive/control circuit 104 determines whether the RC mode is set by the user (step S804). When the RC mode is not set in step S804, the body drive/control circuit 104 displays the screen precedent to the menu screen, on the rear LCD panel 6 (step S806), and returns to the standby state. In contrast, when the RC mode is set in step S804, the body drive/control circuit 104 displays the screen of the DSP3 shown in FIG. 6 on the rear LCD panel 6 (step S805). Namely, when the RC mode is set by the user, an exclusive screen that is displayed only in the RC mode is displayed.

FIGS. 9 to 12 are flowcharts of photography control operations in the RC mode of the camera 100. These operations are executed when the release button 4a is pressed and the first release switch is turned on in the RC mode.

When the user presses the release button 4a to the half depth, the first release switch is turned on. When detecting the turning-on of the first release switch, the body drive/control circuit 104 executes the AF and AE operations (step S901). After executing the AF and AF operations, the body drive/control circuit 104 determines whether the user presses the release button 4a to the full depth and the second release switch is turned on (step S902). The body drive/control circuit 104 waits until the second release switch is turned on in step S902. When the second release switch is turned on in step S902, the body drive/control circuit 104 defines the values of DT1, DT2 and DT3 and the time corresponding to these values, from the channel and light emission mode set before photo-shooting and used for communication with each external flash unit (step S903).

Next, the body drive/control circuit 104 controls the flash control circuit 102 to start emission of light for communication using the built-in flash 3. For this purpose, first the body drive/control circuit 104 performs the first time light emission SFL1 (step S904). After the first time light emission SFL1, the body drive/control circuit 104 determines whether T(DT1) that is the time corresponding to DT1 has elapsed (step S905). The body drive/control circuit 104 waits until T(DT1) has elapsed in step S905. After confirming that T(DT1) has elapsed in step S905, the body drive/control circuit 104 performs the next light emission SFL2 (step S906). After the light emission SFL2, the body drive/control circuit 104 determines whether T(DT2) that is the time corresponding to DT2 has elapsed (step S907). The body drive/control circuit 104 waits until T(DT2) has elapsed in step S907. After confirming that T(DT2) has elapsed in step S907, the body drive/control circuit 104 performs the next light emission SFL3 (step S908). After the light emission SFL3, the body drive/control circuit 104 determines whether T(DT3) that is the time corresponding to DT3 has elapsed (step S909). The body drive/control circuit 104 waits until T(DT3) has elapsed in step S909. After confirming that T(DT3) has elapsed in step S909, the body drive/control circuit 104 performs the next light emission SFL4 (step S910). Transmission of DT1, DT2 and DT3 is completed by the above operation.

Next, the body drive/control circuit 104 emits a trigger light to instruct pre-light emission. For this purpose, after the light emission SFL4, the body drive/control circuit 104 determines whether predetermined time T(TM1) necessary for each external flash unit to determine the received data and to prepare pre-light emission has elapsed (step S911) The body drive/control circuit 104 waits until T(TM1) has elapsed in step S911. After confirming that T(TM1) has elapsed in step S911, the body drive/control circuit 104 performs the light emission SFL5 as a trigger light emission for pre-light emission (step S912). After the light emission SFL5, each external flash unit performs pre-light emission. Then, the body drive/control circuit 104 measures a subject illuminated by the pre-flight emission, by the TTL light adjustment circuit 105 (step S913). Based on the measurement result, the amount of light to be emitted by each external flash unit, or the corresponding numeric value (the aperture value and distance to a subject for calculating the amount of light emission) is determined. According to the determined value, the body drive/control circuit 104 calculates the values of the data DT4, DT5 and DT6 to be sent to each external flash unit, and the time corresponding to these values (step S914).

After calculating the values of DT4, DT5 and DT6, the body drive/control circuit 104 determines whether predetermined time T(TM2) necessary for each external flash unit to prepare for receiving the next data has elapsed (step S915). The body drive/control circuit 104 waits until T(TM2) has elapsed in step S915. After confirming that T(TM2) has elapsed in step S915, the body drive/control circuit 104 performs the next light emission SFL6 (step S916). By the light emission SFL6, transmission of data for the light emission control of each external flash unit is started.

After the light emission SFL6, the body drive/control circuit 104 determines whether T(DT4) that is the time corresponding to DT4 has elapsed (step S917). The body drive/control circuit 104 waits until T(DT4) has elapsed in step S917. After confirming that T(DT4) has elapsed in step S917, the body drive/control circuit 104 performs the next light emission SFL7 (step S918). After the light emission SFL7, the body drive/control circuit 104 determines whether T(DT5) that is the time corresponding to DT5 has elapsed (step S919). The body drive/control circuit 104 waits until T(DT5) has elapsed in step S919. After confirming that T(DT5) has elapsed in step S919, the body drive/control circuit 104 performs the next light emission SFL8 (step S920). After the light emission SFL8, the body drive/control circuit 104 determines whether T(DT6) that is the time corresponding to DT6 has elapsed (step S921). The body drive/control circuit 104 waits until T(DT6) has elapsed in step S921. After confirming that T(DT6) has elapsed in step S921, the body drive/control circuit 104 performs the next light emission SFL9 (step S922).

Transmission of data to each external flash unit is completed by the above operation. Thereafter, photo-shooting is executed. After the light emission SFL9, the body drive/control circuit 104 starts moving up a not-shown quick return mirror (step S923). After the mirror is moved up, the body drive/control circuit 104 starts running a front shutter blind of a not-shown focal plane shutter (step S924). After running the front shutter blind, the body drive/control circuit 104 determines whether the running of the front shutter blind is completed (step S925). The body drive/control circuit 104 waits until the running of the front shutter blind is completed in step S925. When the running of the front shutter blind is completed in S926, the body drive/control circuit 104 performs the light emission SFL10 as a trigger light emission for full-light emission (step S926). Each external flash unit emits full-light in synchronization with the light emission SFL10.

After the light emission SFL10, the body drive/control circuit 104 starts running of a rear shutter blind of a not-shown focal, plane shutter (step S927). After starting the running of the rear shutter blind, the body drive/control circuit 104 determines whether the running of the rear shutter blind is completed (step S928). The body drive/control circuit 104 waits until the running of the rear shutter blind is completed in step S928. When the running of the rear shutter blind is completed in S928, the body drive/control circuit 104 determines that the photo-shooting is finished. Then, the body drive/control circuit 104 reads image data from the circuit 107 (step S929). Next, the body driving circuit 104 executes digital image processing in the image processing circuit 107 (step S930). After the image processing, the body drive/control circuit 104 writes the processed image data to the recording medium 108 (step S931). This completes the wireless flash photography.

FIGS. 13 to 17 are flowchart showing the operations in the RC mode of an external flash unit. The operations in FIGS. 13 to 17 are executed when the mode switch 15 of each external flash unit is set to the "RC" position.

When the mode switch 15 is set to the "RC" position, the flash control circuit 202 turns on the slave sensor 13 (step S1001), and waits for a signal from the slave sensor 13 (step S1002). When a signal from the slave sensor 13 is detected in step S1002, or when a signal flash from the camera 100 is detected, the flash control circuit 202 recognizes the light emission SFL1. Thereafter, the flash control circuit 202 resets and starts a timer in the data detection circuit 204 (step S1003).

After the timer starts counting, the flash control circuit 202 waits for the next signal (i.e., SFL2) from the slave sensor 13 (step S1004). When the signal from the slave sensor 13 is detected in step S1004, the flash control circuit 202 recognizes the light emission SFL2. Then, the flash control circuit 202 reads the indication of the timer in the data detection circuit 204 (step S1005). Then, the flash control circuit 202 resets and starts the timer in the data detection circuit 204 (step S1006). Thereafter, the flash control circuit 202 calculates the value of DT1 from the timer indication read from the data detection circuit 204, by a time-data correspondence table or equation (step S1007).

After calculating the value of DT1, the flash control circuit 202 waits for the next signal (SFL3) from the slave sensor 13 (step S1008). When the next signal from the slave sensor 13 is detected in step S1008, the flash control circuit 202 recognizes the light emission SFL3. Then, the flash control circuit 202 reads the indication of the timer in the data detection circuit 204 (step S1009). Then, the flash control circuit 202 resets and starts the timer in the data detection circuit 204 (step S1010). Thereafter, the flash control circuit 202 calculates the value of DT2 from the timer value read from the data detection circuit 204, by a time-data correspondence table or equation (step S1011). After calculating the value of DT2, the flash control circuit 202 waits for the next signal (SFL4) from the slave sensor 13 (step S1012). When the signal from the slave sensor 13 is detected in step S1012, the flash control circuit 202 recognizes the light emission SFL4. Then, the flash control circuit 202 reads the indication of the timer in the data detection circuit 204 (step S1013). Then, the flash control circuit 202 resets and starts the timer in the data detection circuit 204 (step S1014). Thereafter, the flash control circuit 202 calculates the value of DT3 from the timer indication read from the data detection circuit 204, by a time-data correspondence table or equation (step S1015). By the above operation, each external flash unit completes reception of the data from the camera 100 for the channel and the light emission mode for each group sent.

After calculating the value of DT3, the flash control circuit 202 waits for the next signal (SFL5) from the slave sensor 13 (step S1016). When the next signal from the slave sensor 13 is detected in step S1016, the flash control circuit 202 recognizes the light emission SFL5. In this case, the flash control circuit 202 recognizes the light as a trigger signal for pre-light emission from the camera 100. The flash control circuit 202 immediately resets and starts the timer (step S1017), and then executes pre-light emission (step S1018). The amount of light emitted at the pre-light emission is previously fixed to a certain value.

After the pre-light emission, the flash control circuit 202 waits for the next signal (SFL6) (step S1019). The SFL6 is the light emission to indicate start of data transmission at and after DT4. When the signal from the slave sensor 13 is detected in step S1019, the flash control circuit 202 recognizes the light emission SFL6. The flash control circuit 202 resets and starts the timer in the data detection circuit 204 (step S1020). Thereafter, the flash control circuit 202 waits for the next signal (SFL7) (step S1021). When the signal from the slave sensor 13 is detected in step S1021, the flash control circuit 202 recognizes the light emission SFL7. The flash control circuit 202 reads the indication of the timer in the data detection circuit 204 (step S1022). Then, the flash control circuit 202 resets and starts the timer in the data detection circuit 204 (step S1023). Thereafter, the flash control circuit 202 calculates the value of DT4 from the timer value read from the data detection circuit 204, by a time-data correspondence table or equation (step S1024). After calculating the value of DT4, the flash control circuit 202 waits for the next signal (SFL8) from the slave sensor 13 (step S1025). When the next signal from the slave sensor 13 is detected in step S1025, the flash control circuit 202 recognizes the light emission SFL8. Then, the flash control circuit 202 reads the indication of the timer in the data detection circuit 204 (step S1026). Then, the flash control circuit 202 resets and starts the timer in the data detection circuit 204 (step S1027). Thereafter, the flash control circuit 202 calculates the value of DT5 from the timer value read from the data detection circuit 204, by a time-data correspondence table or equation (step S1028). After calculating the value of DT5, the flash control circuit 202 waits for the next signal (SFL9) from the slave sensor 13 (step S1029). When the signal from the slave sensor 13 is detected in step S1029, the flash control circuit 202 recognizes the light emission SFL9. Then, the flash control circuit 202 reads the indication of the timer in the data detection circuit 204 (step S1030). Then, the flash control circuit 202 resets and starts the timer in the data detection circuit 204 (step S1031). Thereafter, the flash control circuit 202 calculates the value of DT6 from the timer value read from the data detection circuit 204, by a time-data correspondence table or equation (step S1032). By the above operation, each external flash unit receives all data. The flash control circuit 202 adopts the data corresponding to the channel and group set for itself, among the received data, and determines the data corresponding to the amount of light emitted at full-light emission (step S1033).

After determining the amount of light emitted at the full-light emission, the flash control circuit 202 waits for the next signal (SFL10) from the slave sensor 13 (step S1034). When the signal from the slave sensor 13 is detected in step S1034, the flash control circuit 202 executes the full-light emission (step S1035). This completes the wireless flash photography.

Figure 18:
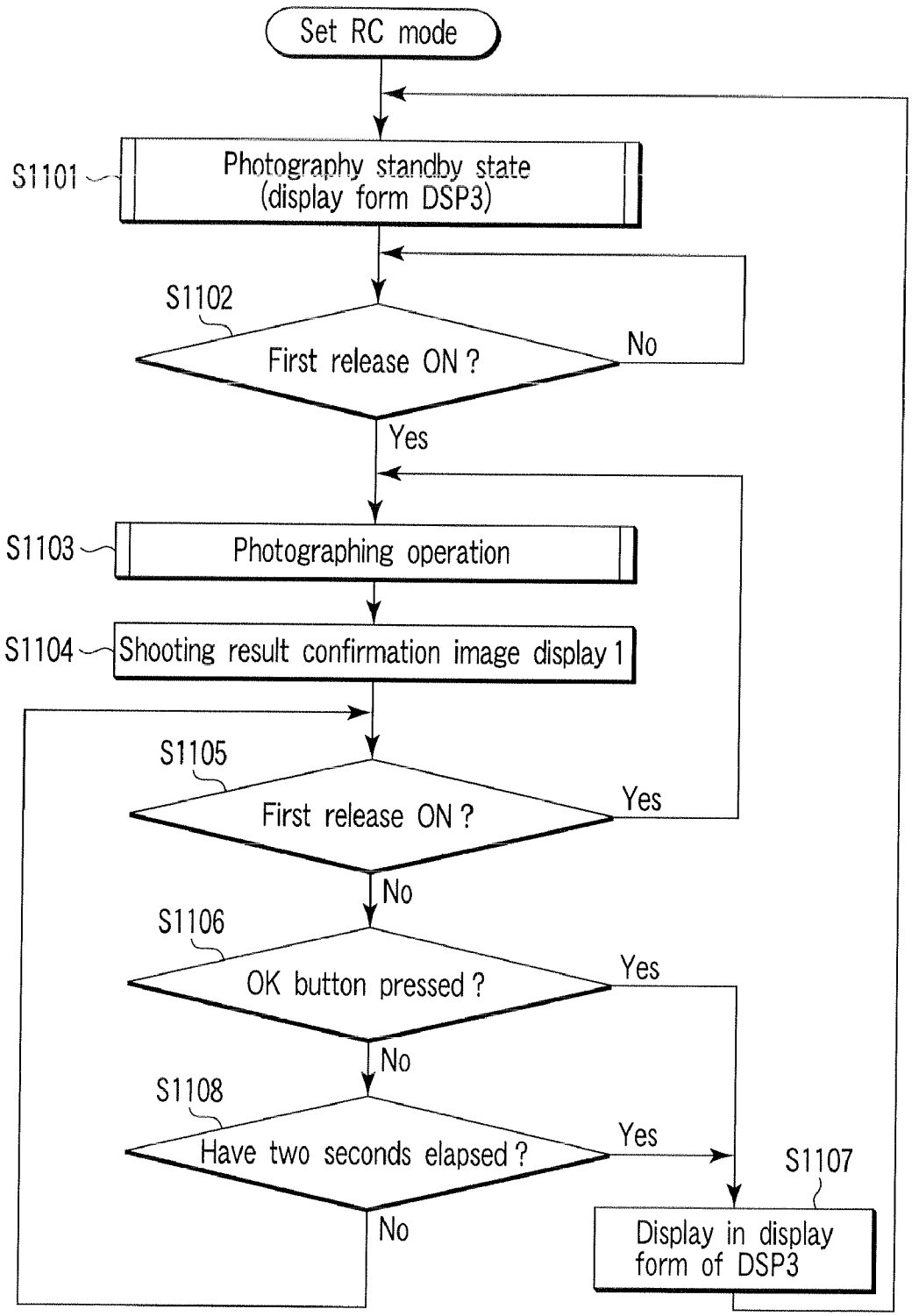
FIG. 18 is a flowchart of display operations of a rear LCD panel of a camera at wireless flash photography according to a first embodiment.
Figure 19:
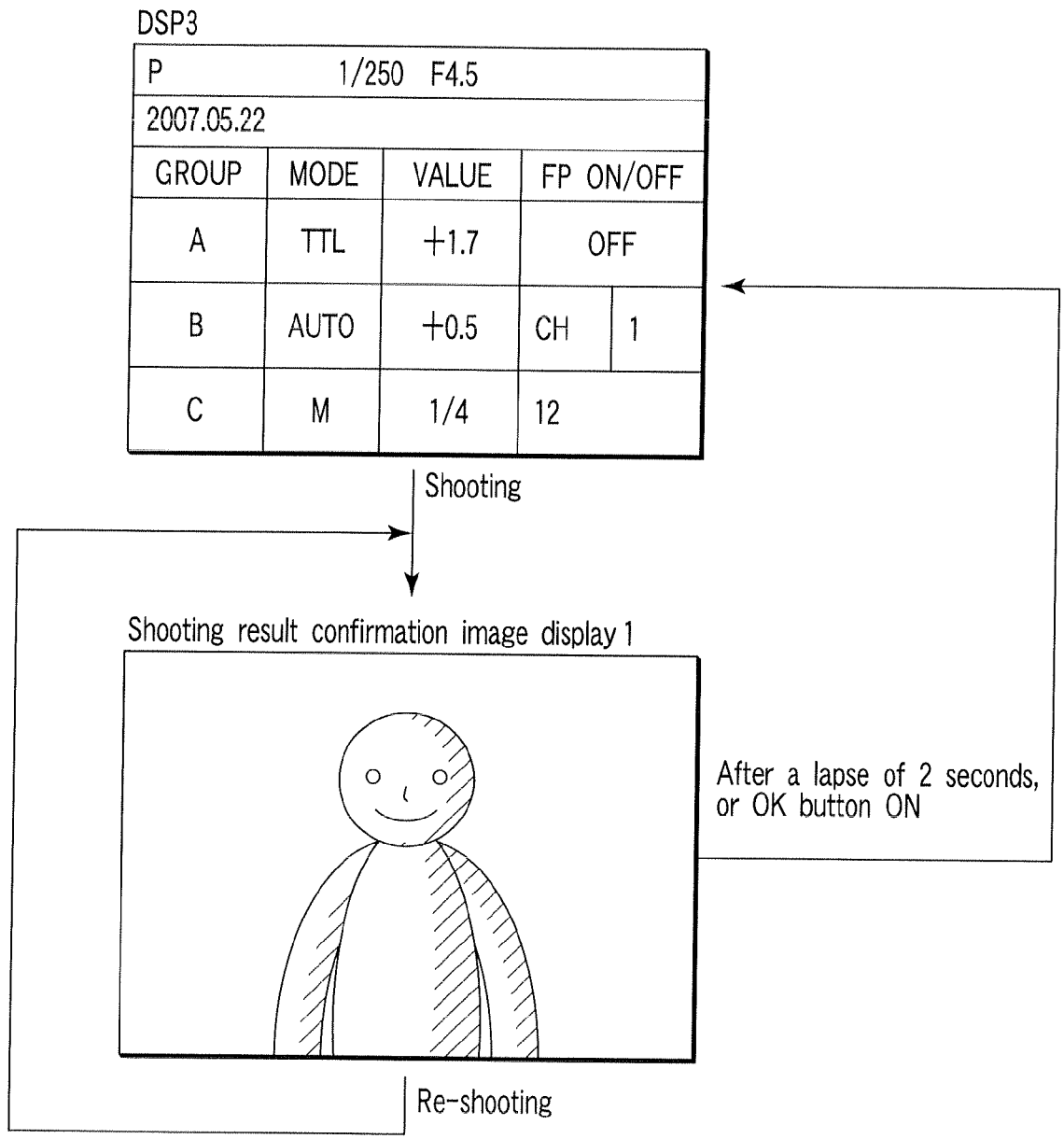
FIG. 19 is a diagram showing transition of screens of a rear LCD panel of a camera according to the operation of FIG. 18.

FIG. 18 is a flowchart of the display operation of the rear LCD panel 6 at the wireless flash photography described above. FIG. 19 is a diagram showing transition of screens according to the operation shown in FIG. 18.

First, in the photography standby state immediately after the RC mode is selected on the menu screen of the camera 100, the body drive/control circuit 104 displays the screen of DSP3 on the rear LCD panel 6, as shown in FIG. 19 (step S1101). In the standby state, each time the INFO button f4 is pressed, the screen is changed as shown in FIG. 6.

In the standby state in the RC mode, the body drive/control circuit 104 determines whether the first release switch is turned on by the user by pressing the release button 4*a* to the half depth (step S1102). When the first release switch is turned on, the body drive/control circuit 104 executes the operation of wireless flash photography, as shown in FIGS. 9 to 12 (step S1103). After executing the wireless flash photography, the body drive/control circuit 104 displays the obtained image in full size on the rear LCD panel 6 (step S1104). Hereinafter, such a display form that the latest photographed image is displayed in full size on the rear LCD panel 6 is called a shooting result confirmation image display 1.

After providing the shooting result confirmation image display 1, the body drive/control circuit 104 determines whether the first release switch is turned on again (step S1105). When the first release switch is turned on in step S1105, the body drive/control circuit returns to step S1103 for moving to the photographing operation.

When the first release switch is not turned on in step S1105, the body drive/control circuit 104 determines whether the OK button of the cross button 4*c* is pressed (step S1106). When the OK button is pressed in step S1106, the body drive/control circuit 104 stops displaying the shooting result confirmation image display 1, and displays the screen of DSP3 shown in FIG. 19 (step S1107). Even while the shooting result confirmation image display 1 is being displayed, it is possible to immediately display a display screen for setting various items for the wireless flash photography, by a predetermined operation.

When the OK button is not pressed in step S1106, the body drive control circuit 104 determines whether a predetermined time (e.g., 2 seconds) has elapsed (step S1108). When the predetermined time does not elapse in the step S1108, the process returns to step S1105. When the predetermined time has elapsed in step S1108, the body drive/control circuit 104 stops displaying the shooting result confirmation image display 1, and displays the screen of DSP3 shown in FIG. 19 on the rear LCD panel 6.

As explained above, according to the first embodiment, it is possible to alternately and momentarily change the screen displaying the latest photographed image and the screen for setting various items for the wireless flash photography, in the wireless flash photography which realizes optimum image expression by optimizing the values for setting the operating conditions of each external flash unit, while making test shooting. This enables to optimize setting values within a short time.

When the wireless flash photography is performed, an image to confirm the shooting result is automatically displayed, and then the display is automatically changed to the wireless flash control setting change screen. Therefore, the display screen may not necessarily be changed by the user. The user can concentrate on photo-shooting, checking photographed images, and setting various conditions for the wireless flash photography.

As a shooting result confirmation image display 1, a shooting result is displayed in full size on the rear LCD panel 6, and the displayed image can be checked quickly and precisely.

Embodiment 2

A second embodiment of the invention will be explained. The second embodiment is different from the first embodiment in the display form of a shooting result confirmation screen. Namely, in the second embodiment, when the setting for the wireless flash photography is changed, two images before and after the change of setting are displayed on the same screen, as a shooting result confirmation image display 2, instead of the shooting result confirmation image display 1 explained in the first embodiment.

The configuration of the camera 100 and external flash unit 200, and the operations of wireless flash photography are the same as in the first embodiment, and explanation on them will be omitted.

Figure 20:
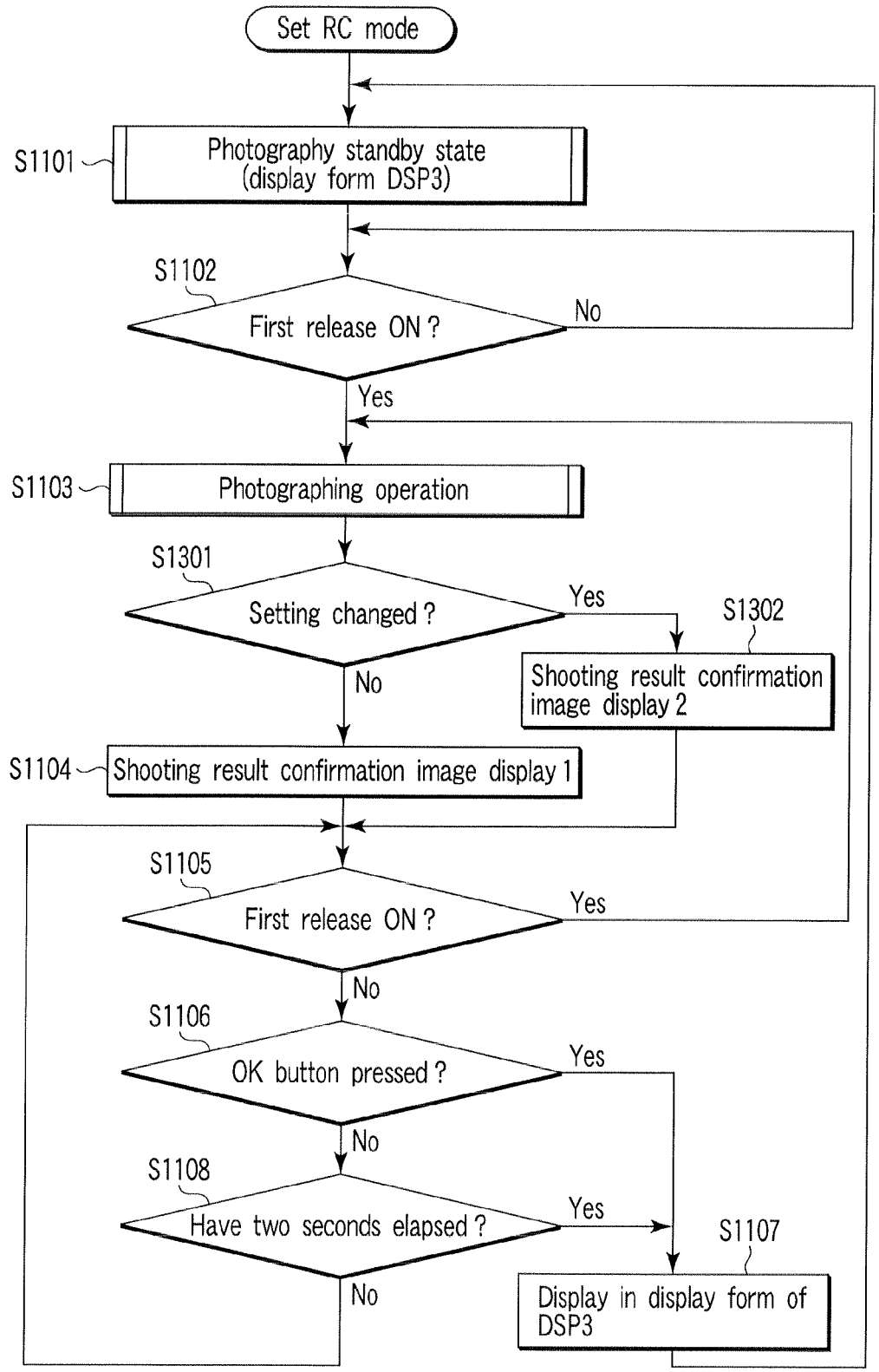
FIG. 20 is a flowchart of display operations of a rear LCD panel of a camera at wireless flash photography according to a second embodiment.
Figure 21:
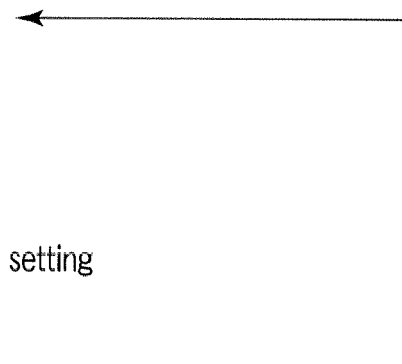
FIG. 21 is a diagram showing a shooting result confirmation image display 2 in a second embodiment.
Figure 21:
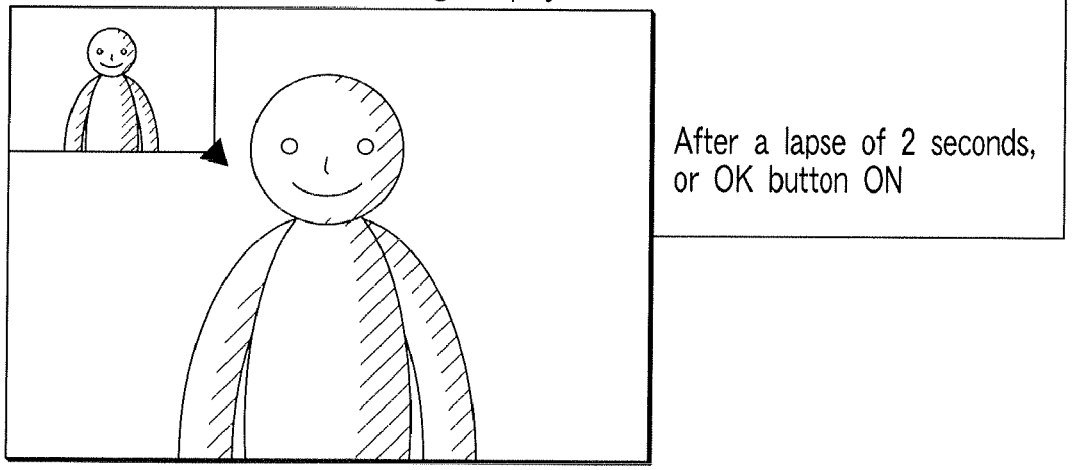

FIG. 20 is a flowchart of the display operation of the rear LCD panel 6 at the wireless flash photography according to a second embodiment. FIG. 21 is a diagram showing a shooting result confirmation image display 2 in a second embodiment.

In FIG. 20, the same operations as in FIG. 18 are given the same reference numbers, and explanation on them will be omitted. Only the different points from FIG. 18 will be explained. In FIG. 20, when the first release switch is turned on in the standby state, the body drive/control circuit 104 of the camera 100 performs the wireless flash photography. After the wireless flash photography, the body drive/control circuit 104 determines whether the shooting is done after the setting for the wireless flash photography is changed (step S1301). The first time shooting is assumed to be done before the setting is changed.

When the shooting is determined done not after the setting is changed in the step S1301, the body drive/control circuit 104 displays the shooting result confirmation image display 1, which displays the latest photographed image as shown in FIG. 19 (step S1104). When the shooting is determined done after the setting is changed, the body drive/control circuit 104 displays the shooting result confirmation image display 2 as shown in FIG. 21 (step S1302). The shooting result confirmation image display 2 is a display form when the user takes a photo while changing the setting. In the shooting result confirmation image display 2, the image photographed before the setting is changed is displayed as a reduced image in the upper left of the screen, for example, and the latest photographed image is displayed large. This permits confirming the difference in the brightness and shading in two images taken before and after the setting change, and grasping the effect of changing the setting.

When shooting is repeated without changing the setting after the images before and after the setting change are displayed at the same time in step S1302, the step S1301 is branched to the step S1104, and the shooting result confirmation image display 1 is displayed.

As explained above, according to the second embodiment, it is possible to confirm two images taken before and after the setting change on the same screen, at shooting after the setting is changed. Therefore, it is easy to confirm the effect of changing the setting for the wireless flash photography.

Further, in the second embodiment, two images taken before and after the setting change are simultaneously displayed only when the setting is changed. Therefore, an image taken without changing the setting can be precisely checked in full size, and an optimum shooting confirmation image can be viewed according to the operation before photo-shooting.

As a modification of the second embodiment, the shooting result confirmation image displays 1 and 2 may not be automatically switched, but may be fixed to one of them at the user's will. In this modification, the display form of the shooting result confirmation image is not changed by whether the setting is changed or not. This is preferable for the user who does not want to change the display form of the shooting result confirmation image.

Embodiment 3

A third embodiment of the invention will be explained. The third embodiment is different from the first and second embodiments in the display form of the screen for changing the operating conditions of the external flash unit 200 at the wireless flash photography. Namely, in the third embodiment, when the setting for the wireless flash photography is changed, two images taken before and after the setting change are displayed on the operating condition setting change screen, and the changed value is also displayed.

The configuration of the camera 100 and external flash unit 200, and the operations of the wireless flash photography are the same as in the first embodiment, and explanation on them will be omitted.

Figure 22:
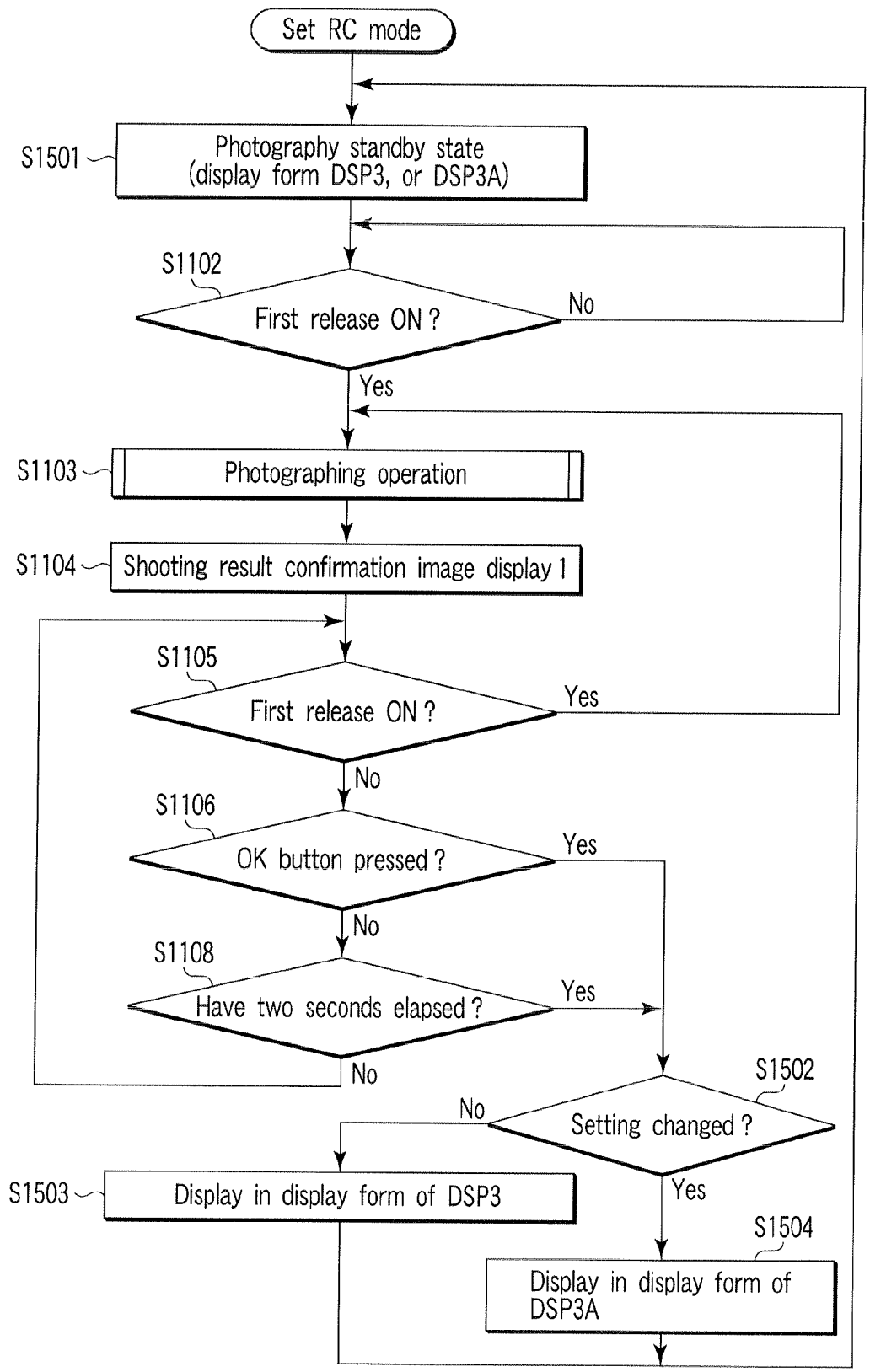
FIG. 22 is a flowchart of display operations of a rear LCD panel of a camera at wireless flash photography according to a third embodiment.
Figure 23:
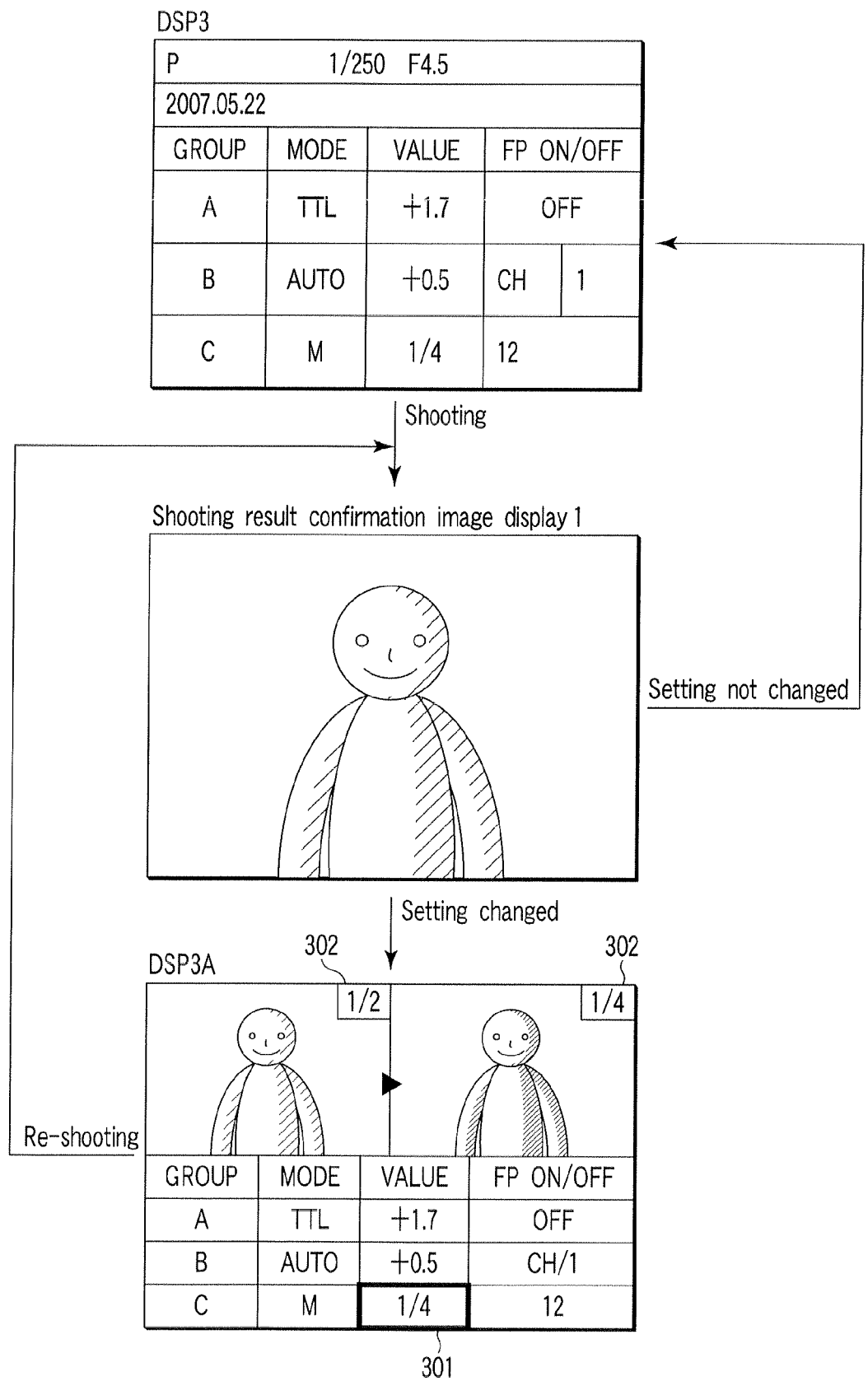
FIG. 23 is a diagram showing transition of screens of a rear LCD panel of a camera according to the operation in FIG. 22.

FIG. 22 is a flowchart of the display operation of the rear LCD panel 6 at the wireless flash photography according to a third embodiment. FIG. 23 is a diagram showing transition of screens according to the operation in FIG. 22.

In FIG. 22, only the points different from FIG. 18 will be explained. In the standby state immediately after the RC mode is selected on the menu screen of the camera 100, the body drive/control circuit 104 displays the screen of DSP3 or DSP3A shown in FIG. 23 (step S1501). Immediately after the RC mode is selected, no image is obtained, and the screen of DSP3 is displayed.

Thereafter, when the wireless flash photography is performed and an image is obtained, the body drive/control circuit 104 displays the shooting result confirmation image display 1. When the OK button is pressed in step S1106, or when a predetermined time (e.g., 2 seconds) has elapsed in step S1108, the body drive/control circuit 104 determines whether the image taken by the wireless flash photography is obtained after the setting is changed (step S1502). When the image is obtained without changing the setting in step S1502, the screen of DSP3 is displayed (step S1503). Thereafter, the body drive/control circuit 104 returns to the step S1501, and goes into the standby state. In contrast, when the setting is changed in step S1502, the body drive/control circuit 104 displays the screen of DSP3A shown in FIG. 23 (step S1504). Then, the body drive/control circuit 104 returns to the step S1501, and goes into the standby state.

In this embodiment, when the wireless flash photography is performed, after the shooting result confirmation image display 1 is displayed, only when the image is taken after the setting is changed, the photographed image and the operating condition setting change screen are displayed on the same screen, reflecting the operation of the OK button or a lapse of predetermined time. At this time, the setting item changed on the DSP3A is indicated by a reference number 301, for example, and the set value before the setting change is indicated by a reference number 302, for example.

As explained above, according to the third embodiment, when the setting for the wireless flash photography is changed, two images taken before and after the change are displayed on the same screen. Further, the changed numeric value is also displayed. This facilitates re-setting the numeric values for the next time shooting.

As a modification of the third embodiment, DSP3 and DSP3A may not be automatically switched, and may be fixed to one of them at the user's will. In this modification, the display form of the operating condition setting change screen is not changed by whether the setting is changed or not. This is preferable for the user who does not want to change the display form of the operating condition setting change screen.

Embodiment 4

A fourth embodiment of the invention will be explained. The fourth embodiment is different from the first embodiment in the point that ON/OFF of the RC mode is automatically set according to the display form of the rear LCD panel 6.

The configuration of the camera 100 and external flash unit 200, and the operations of the wireless flash photography are the same as in the first embodiment, and explanation on them will be omitted.

FIG. 24 is a diagram showing transition of screens of the rear LCD panel 6 of the camera 100 in the photography standby state in a fourth embodiment. As shown in FIG. 24, in the fourth embodiment, the displays of DSP1, DSP2 and DSP3 are changed each time the INFO button 4f is pressed, as in the first embodiment. When the display is changed to DSP3, the RC mode is set.

According to the fourth embodiment, ON/OFF of the RC mode is switched according to the display form of the rear LCD panel 6. This is preferable for the user who often switches ON/OFF of the RC mode.

Embodiment 5

A fifth embodiment of the invention will be explained. The fifth embodiment is different from the above embodiments in the point that an external flash unit is used as a light source of a master flash unit, instead of the built-in flash 3

Figure 25:
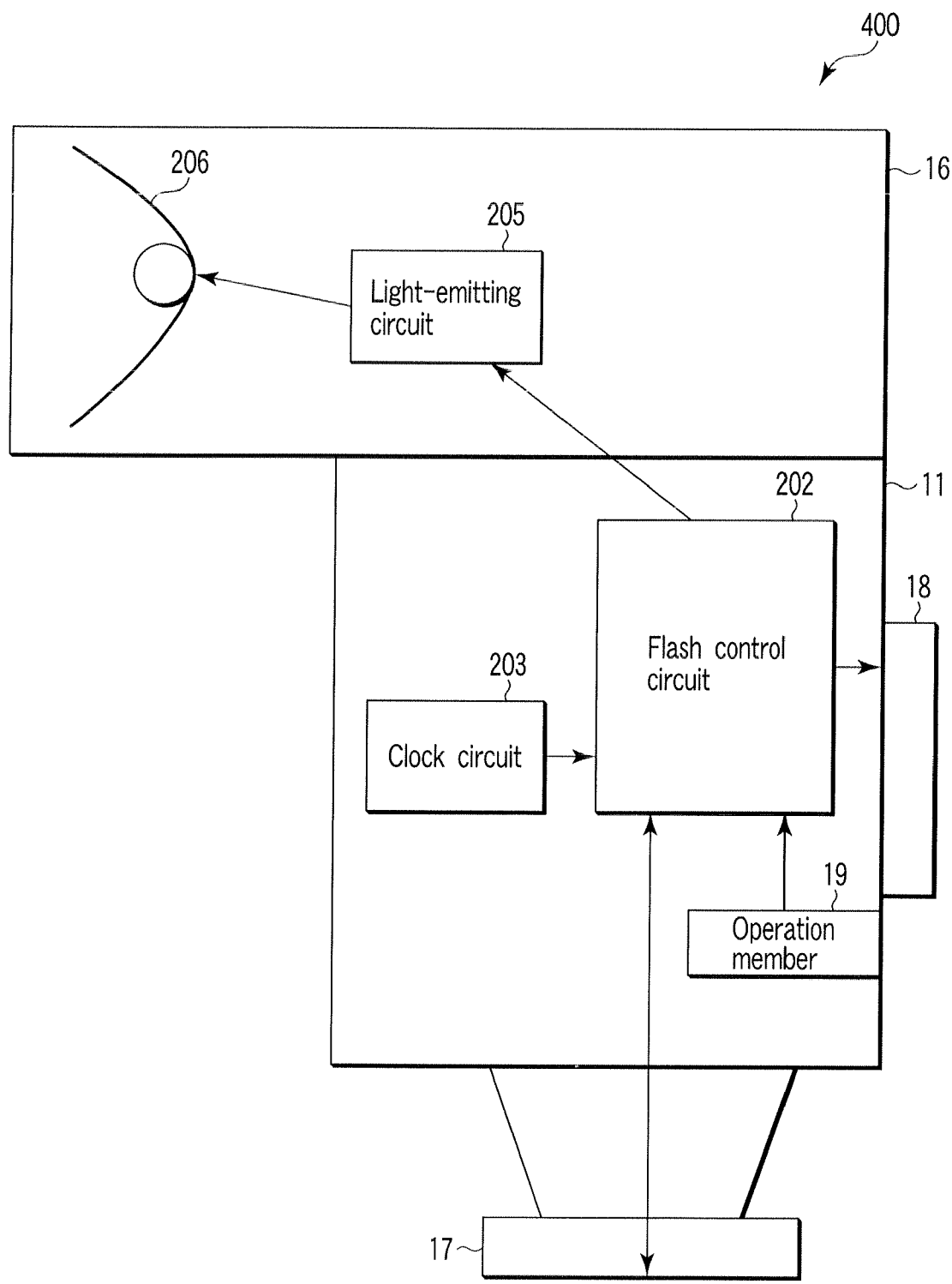
FIG. 25 is an internal circuit diagram of an external flash unit in a fifth embodiment.

FIG. 25 is an internal circuit diagram of an external flash unit as a Light source of a master flash unit in a fifth embodiment. An external flash unit 400 shown in FIG. 25 has a flash main unit 11 and a light-emitting unit 16, similar to the external flash unit 200 shown in FIG. 5. The flash main unit 11 of the external flash unit 400 has a flash control circuit 202, and a clock circuit 203. The flash control circuit 202 is connected to the rear LCD panel 18 provided on the outside of the flash main unit 11, and an operation member 19. The light-emitting unit 16 has a light-emitting circuit 205 and a flash-emitting part 206.

In FIG. 25, the same components as in FIG. 5 are given the same reference numbers, and an explanation on these components will be omitted. Only the parts different from FIG. 5 will be explained. The rear LCD panel 18 is provided at the rear of the flash main unit 11. The rear LCD panel 18 is a display for displaying various screens for confirming various information and setting about flash shooting. The operation members 19 are members such as a power switch and a cross button used by the user for operating the external flash unit 400.

Figure 26:
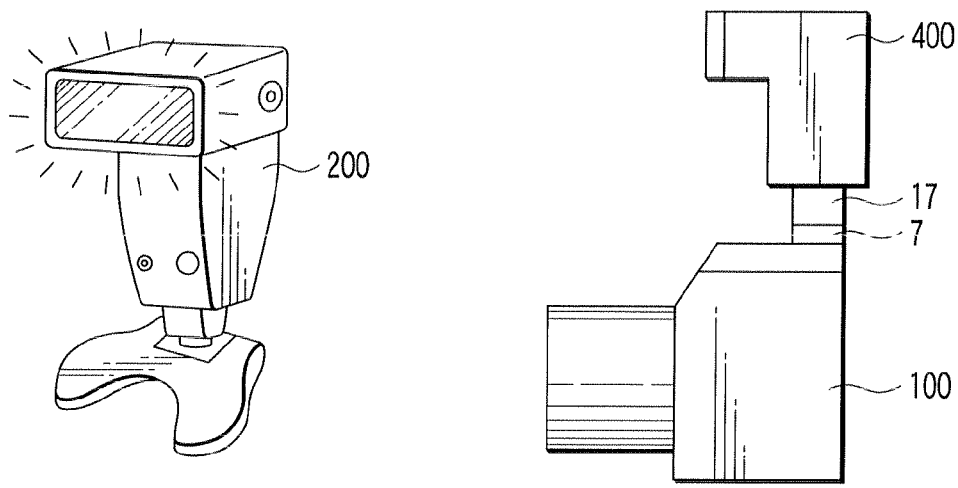
FIG. 26 is a diagram showing an external flash unit as a master flash unit, attached to a camera in a fifth embodiment.

In the fifth embodiment, as shown in FIG. 26, a hot shoe 17 is provided at the bottom of the flash main unit 11 of the external flash unit 400. The hot shoe 17 is inserted into a hot shoe plate 7 provided at the top of the camera 100, thereby the external flash unit 400 can be fixed to the camera 100. Then, the body drive/control circuit 104 of the camera 100 is communicatively connected to the flash control circuit 202 of the external flash unit 400.

In the fifth embodiment, the signal flash time for data transmission is controlled by the flash control circuit 202 by counting a clock signal generated in the clock circuit 203. The signal flash SFL1 to SFL10 is emitted according to the instruction from the body drive/control circuit 104 of the camera 100.

Figure 27:
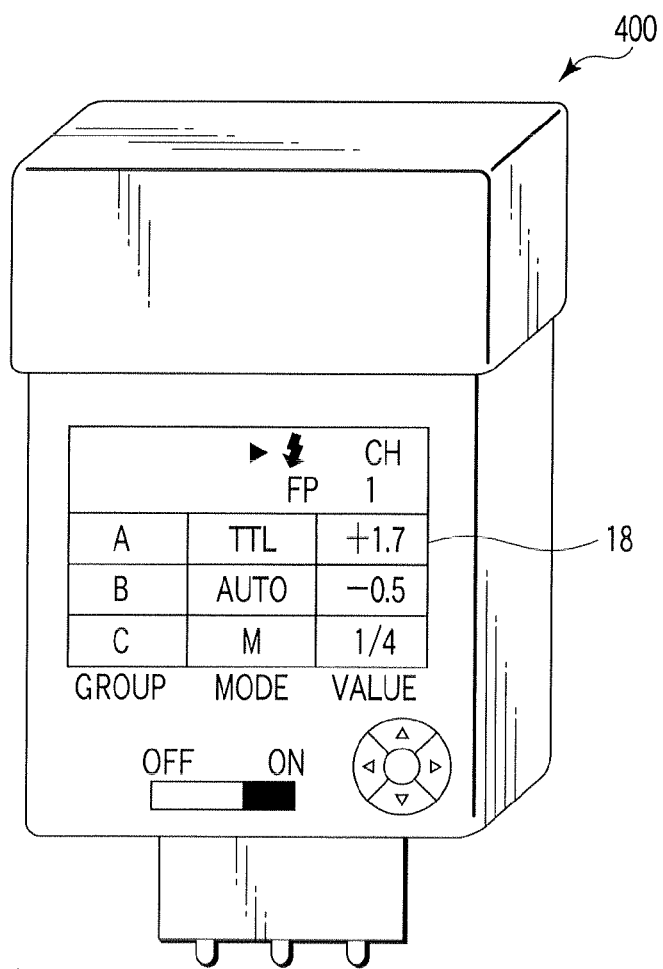
FIG. 27 is a diagram showing transition of screens of a rear LCD panel of a camera in a photography standby state in a fifth embodiment.
Figure 28:
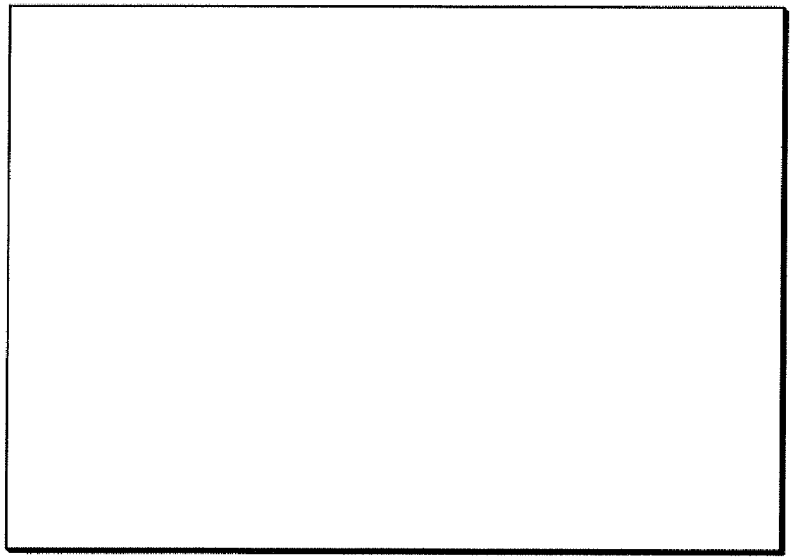
FIG. 28 is a diagram showing a screen displayed on a rear LCD panel of an external flash unit in a photography standby state in a fifth embodiment.

Further, in the fifth embodiment, the external flash unit 400 set to the RC mode is attached to the camera 100. When the external flash unit 400 is turned on, the camera 100 is forcibly set to the RC mode. At this time, setting for wireless flash photography is performed on the setting change screen displayed on the rear LCD panel 18 of the external flash unit 400, as shown in FIG. 27. Therefore, as shown in FIG. 28, DSP3 is not displayed on the rear LCD panel 6 of the camera 100, though the RC mode has been set, and DSP1 and DSP2 are switched each time the INFO button 4f is pressed. However, in order to indicate the user that the camera is now in the RC mode, a RC mark indicated by the reference number 501 is displayed on the DSP1.

The shooting result confirmation image after the wireless flash photography is displayed on the rear LCD panel 6 of the camera 100.

As explained above, according to the fifth embodiment, the screen for setting and changing the operating conditions of the external flash unit 200 can be displayed in the external flash unit 400 attached to the camera 100. Therefore, the operating condition setting change screen can be displayed in the external flash unit 400, the DSP1 and other setting change screens can be displayed in the camera 100, and the user can take a picture by monitoring these both screens.

When using the camera in the RC mode, the user simply attaches the external flash unit 400 to the camera 100. This eliminates the necessity of selecting the RC mode on the menu screen of the camera 100, and is convenient when using the camera in the RC mode, and in other modes.

A battery is not shown in the external flash unit 400 shown in FIG. 25. A battery may be built in the unit. When a battery is built in the external flash unit 400, the power for emitting a flash can be supplied within the external flash unit 400. This decreases the battery power consumption in the camera 100.

Embodiment 6

A sixth embodiment of the invention will be explained. The sixth embodiment is a modification of the fifth embodiment, and is different from the fifth embodiment in the point that setting for wireless flash photography is made in the camera, not in the external flash unit 400.

Figure 29:
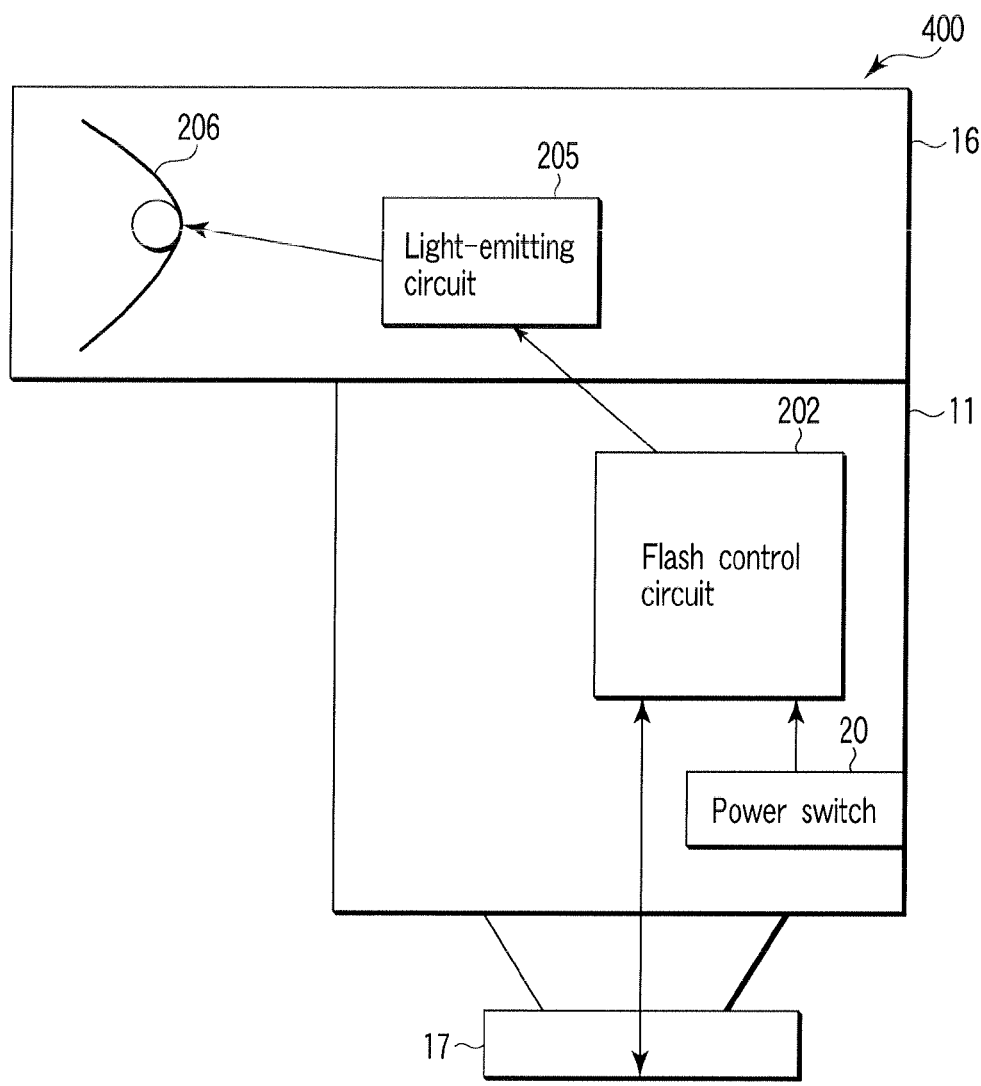
FIG. 29 is an internal circuit diagram of an external flash unit in a sixth embodiment.
Figure 30:
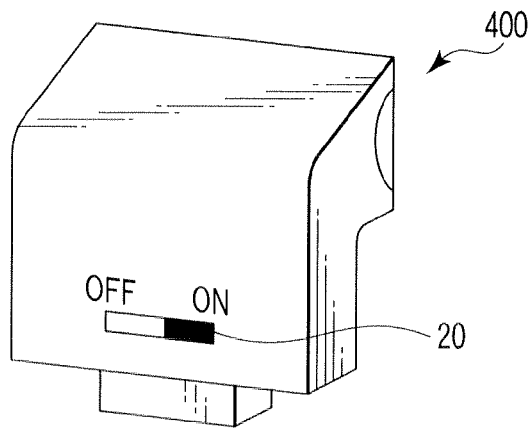
FIG. 30 is a diagram showing a power switch provided in an external flash unit.

FIG. 29 is an internal circuit diagram of an external flash unit that functions as a light source for a master flash unit in a sixth embodiment. The flash main unit 11 of the external flash unit 400 shown in FIG. 29 has a flash control circuit 202. The flash control circuit 202 is connected to a power switch 20 provided on the outside of the flash main unit 11. The light-emitting unit 16 has a light-emitting circuit 205 and a flash-emitting part 206. In FIG. 29, only the parts different from FIG. 25 will be explained. The power switch 20 is provided at the rear of the external flash unit 400, for example, as shown in FIG. 30, and is used to turn on/off the power for the external flash unit 400.

In the sixth embodiment, as shown in FIG. 26, a hot shoe 17 is provided at the bottom of the flash main unit 11 of the external flash unit 400. The hot shoe 17 is inserted into a hot shoe plate 7 provided at the top of the camera 100, thereby the external flash unit 400 can be fixed to the camera 100. Then, the body drive/control circuit 104 of the camera 100 is communicatively connected to the flash control circuit 202 of the external flash unit 400.

In the sixth embodiment, the signal flash time for data transmission is not controlled in the external flash unit 400, but is controlled by the body drive/control circuit 104 by counting a clock signal generated in the clock circuit 103 in the camera 100.

Further, in the sixth embodiment, the operating condition setting change screen is displayed in the camera 100. Therefore, the external flash unit 400 may not have the rear LCD panel 18.

Figure 31:
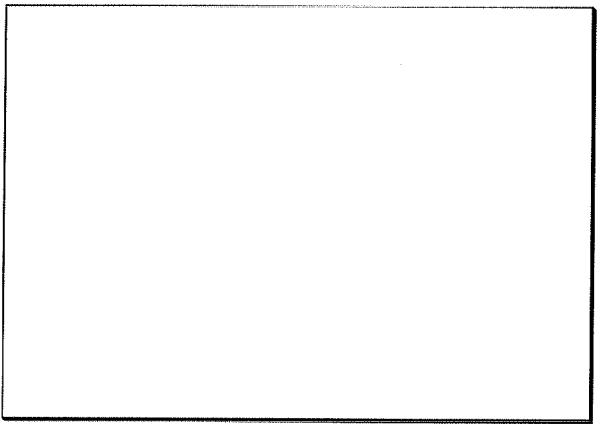
FIG. 31 is a diagram showing transition of screens of a rear LCD panel of a camera in a photography standby state in a sixth embodiment.

When the external flash unit 400 of this embodiment is attached to the camera 100 and is turned on, the camera 100 is set to the RC mode. The display form at this time is almost the same as the display form of the first embodiment shown in FIG. 6, as shown in FIG. 31. However, in order to indicate the user that the camera is set to the RC mode by attaching the external flash unit 400, a RC mark indicated by the reference numbers 601 and 602 is displayed on the DSP1 and DSP3.

As explained above, according to the sixth embodiment, when using the camera in the RC mode, the user simply attaches the external flash unit 400 to the camera 100, as in the fifth embodiment. This eliminates the necessity of selecting the RC mode on the menu screen of the camera 100, and is convenient when using the camera in the RC mode, and in other modes. Further, the external flash unit 400 may not have the rear LCD panel 18. This permits to configure a master flash unit smaller and cheaper than the fifth embodiment.

A battery is not shown in the external flash unit 400 shown in FIG. 29. A battery may be built in the unit. When a battery is built in the external flash unit 400, the power for emitting a flash can be supplied within the external flash unit 400. This decreases the battery power consumption in the camera 100.

In the embodiments explained herein, the operating condition setting change screen of the external flash unit in the wireless flash photography may be a similar screen included in the menu screen, in addition to the screens switched by the INFO button 4f. In this case, it is permitted to automatically return to the operating condition setting change screen included in the menu screen after photo-shooting, or to go to the screen by a predetermined operation. The communication unit in the master flash unit and slave flash unit is not limited to a flash unit using a flash emitted from a xenon flashtube. For example, a LED may be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera to execute a photograph taking operation by using a plurality of remote illumination apparatuses, comprising:
   a mode setting unit which sets an operation mode of the camera to a normal mode or an illumination apparatus control mode;
   a first operating unit which instructs the photograph taking operation using the plurality of remote illumination apparatuses;
   a display unit which selectively displays an image and information, the display unit
   (1) separating the plurality of remote illumination apparatuses into a plurality of groups and displaying a setting screen of operating conditions including an amount of flash or a light adjustment mode of the plurality of remote illumination apparatuses in each of the plurality of groups as information about the plurality of remote illumination apparatuses in each of the plurality of groups when the operation mode of the camera is set to the illumination apparatus control mode, (2) displaying the image obtained by the photograph taking operation if the first operating unit is operated, and (3) displaying information on the photograph taking operation not including the information about the plurality of remote illumination apparatuses in each of the plurality of groups when the normal mode is set;

a setting unit which sets and changes the operating conditions of the plurality of remote illumination apparatuses displayed on the display unit;

a communication unit which instructs the operating conditions set by the setting unit to the plurality of remote illumination apparatuses by wireless communication, prior to a photographing operation; and a control unit which instructs the display unit to display a latest photographed image after the photographing operation is finished in a case where the first operating unit is operated when the operation mode of the camera is set to the illumination apparatus control mode and then instructs the display unit to display the setting screen of the operating conditions including the amount of flash or the light adjustment mode of the plurality of remote illumination apparatuses in each of the plurality of groups, instead of the latest photographed image, when a second operating unit is operated before a lapse of a predetermined time or when the predetermined time has lapsed without operation of the second operating unit.

2. The camera according to claim 1, wherein the control unit first displays the information not including information about the plurality of remote illumination apparatuses on the display unit, then selectively displays the image and information not including information about the plurality of remote illumination apparatuses on the display unit, when the operation mode of the camera is set to the normal mode; and first displays information including information about the plurality of remote illumination apparatuses on the display unit, then selectively displays the image, information not including information about the plurality of remote illumination apparatuses, and information including information about the plurality of remote illumination apparatuses on the display unit, when the operation mode of the camera is set to the illumination apparatus control mode.

3. The camera according to claim 1, wherein when the operating conditions of the illumination apparatus are changed before the photographing operation, the control unit displays a photographed image taken before the operating conditions are changed and a photographed image taken after the operating conditions are changed, on the display unit.

4. The camera according to claim 1, wherein when the operating conditions of at least one of the plurality of remote illumination apparatuses are changed before the photographing operation, a photographed image taken before the operating conditions are changed and a photographed image taken after the operating conditions are changed are displayed on the display unit, in a display form to permit the setting unit to change the setting of operating conditions for the at least one of the plurality of remote illumination apparatuses.

* * * * *